US009553480B2

(12) United States Patent
Sawada et al.

(10) Patent No.: US 9,553,480 B2
(45) Date of Patent: Jan. 24, 2017

(54) POWER SYSTEM

(75) Inventors: Akinobu Sawada, Kyoto (JP); Kenichi Niiyama, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 1033 days.

(21) Appl. No.: 13/522,082

(22) PCT Filed: Dec. 16, 2010

(86) PCT No.: PCT/JP2010/072620
§ 371 (c)(1),
(2), (4) Date: Jul. 13, 2012

(87) PCT Pub. No.: WO2011/086806
PCT Pub. Date: Jul. 21, 2011

(65) Prior Publication Data
US 2012/0286574 A1 Nov. 15, 2012

(30) Foreign Application Priority Data
Jan. 18, 2010 (JP) .................................. 2010-008133

(51) Int. Cl.
*H02J 7/00* (2006.01)
*H02J 7/35* (2006.01)
(Continued)

(52) U.S. Cl.
CPC .. *H02J 7/35* (2013.01); *H02J 1/10* (2013.01); *H02J 3/32* (2013.01); *H02J 3/383* (2013.01); *H02J 4/00* (2013.01); *H02J 13/0003* (2013.01); *H02J 3/008* (2013.01); *H02J 7/0054* (2013.01); *Y02B 10/14* (2013.01); *Y02E 10/563* (2013.01);
(Continued)

(58) Field of Classification Search
None
See application file for complete search history.

(56) References Cited

U.S. PATENT DOCUMENTS 7,339,353 B1 * 3/2008 Masias et al. ................ 320/138
2007/0114852 A1 * 5/2007 Lin et al. ........................ 307/66
(Continued)

FOREIGN PATENT DOCUMENTS

JP 04-299025 10/1992
JP 11-127546 5/1999
(Continued)

OTHER PUBLICATIONS

International Search Report for International Patent Application No. PCT/JP2010/072620 (mailed Mar. 22, 2011).

*Primary Examiner* — Jared Fureman
*Assistant Examiner* — Joel Barnett
(74) *Attorney, Agent, or Firm* — Fish & Richardson P.C.

(57) ABSTRACT

Disclosed is an electric power system including a first unit (for example, a unit 201) equipped with a first power source (for example, a solar panel (201b)), a first rechargeable battery (for example, a unit storage battery (201c)) to which an output of the first power source is input, and a first power consuming portion (not shown) to which an output of the first rechargeable battery is input; a second rechargeable battery (for example, a shared storage battery (202)); and an electric power line (for example, a shared electric power line (203)) for sharing electric power between the first rechargeable battery and the second rechargeable battery.

20 Claims, 25 Drawing Sheets

(51) Int. Cl.
*H02J 1/10* (2006.01)
*H02J 3/32* (2006.01)
*H02J 3/38* (2006.01)
*H02J 4/00* (2006.01)
*H02J 13/00* (2006.01)
*H02J 3/00* (2006.01)

(52) U.S. Cl.
CPC .............. *Y02E 10/566* (2013.01); *Y02E 40/72* (2013.01); *Y02E 70/30* (2013.01); *Y04S 10/123* (2013.01); *Y10T 307/344* (2015.04); *Y10T 307/62* (2015.04)

(56) References Cited

U.S. PATENT DOCUMENTS

| | | | |
|---|---|---|---|
| 2008/0185915 A1* | 8/2008 | Wang | 307/64 |
| 2010/0001585 A1 | 1/2010 | Nagata | |
| 2011/0178959 A1* | 7/2011 | Nakajima | B60L 11/1824 705/412 |
| 2011/0204720 A1* | 8/2011 | Ruiz | B60L 11/1816 307/66 |
| 2013/0076033 A1* | 3/2013 | Zachary | F24D 5/04 290/2 |

FOREIGN PATENT DOCUMENTS

| | | |
|---|---|---|
| JP | 11-234908 | 8/1999 |
| JP | 2002-044870 A | 2/2002 |
| JP | 2004-156820 | 6/2004 |
| JP | 2006-288162 | 10/2006 |
| JP | 2008-202983 | 9/2008 |
| JP | 2009-232668 | 10/2009 |
| WO | 2008-047400 A1 | 4/2008 |

* cited by examiner

FIG.2A

| SWITCH | OTHER THAN MIDNIGHT | | | | MIDNIGHT |
|---|---|---|---|---|---|
| | WITH POWER GENERATION | | WITHOUT POWER GENERATION | | |
| | SUFFICIENT CHARGE | SHORT CHARGE | SUFFICIENT CHARGE | SHORT CHARGE | |
| A CHARGING BY POWER GENERATION | OFF | (ON) | OFF | OFF | OFF |
| B CHARGING BY BUYING POWER | OFF | OFF | OFF | (ON) | ON |
| C BUYING AND CONSUMING POWER | OFF | (ON) | OFF | (ON) | ON |

FIG.2B

| SWITCH | OTHER THAN MIDNIGHT | | | MIDNIGHT |
|---|---|---|---|---|
| | SUFFICIENT CHARGE | | SHORT CHARGE | |
| | WITH SURPLUS OF POWER BOUGHT IN MIDNIGHT | WITHOUT SURPLUS OF POWER BOUGHT IN MIDNIGHT | | |
| D DC POWER SELLING | ON | OFF | OFF | ON |
| E DC POWER BUYING | OFF | OFF | ON | ON |

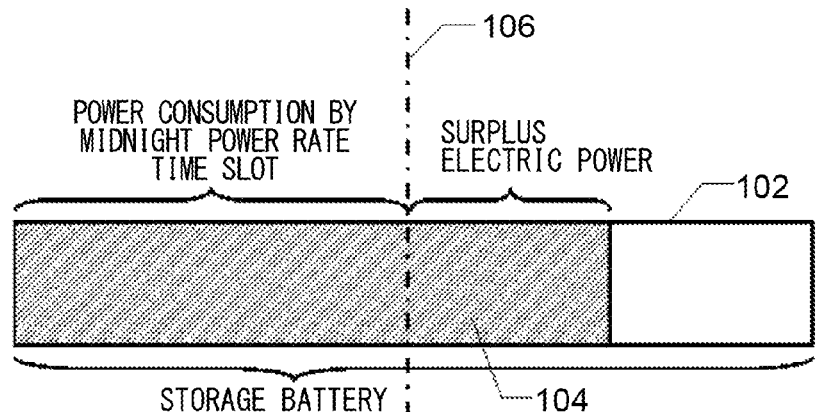
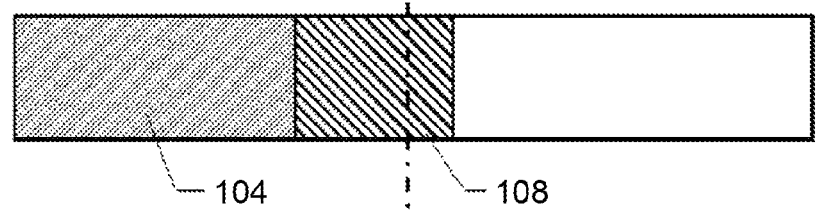
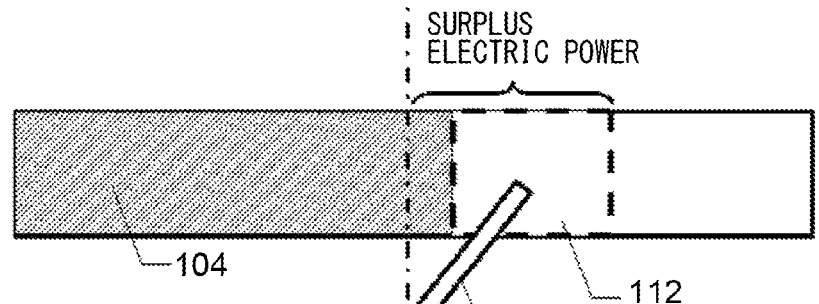
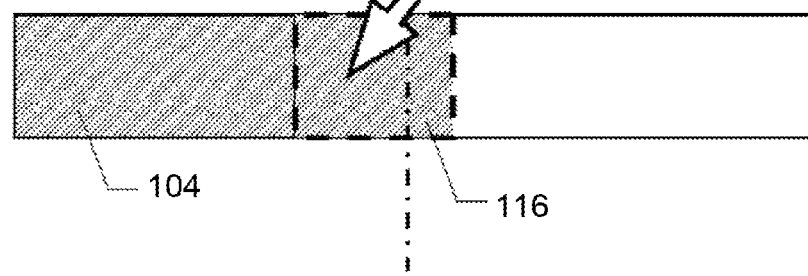

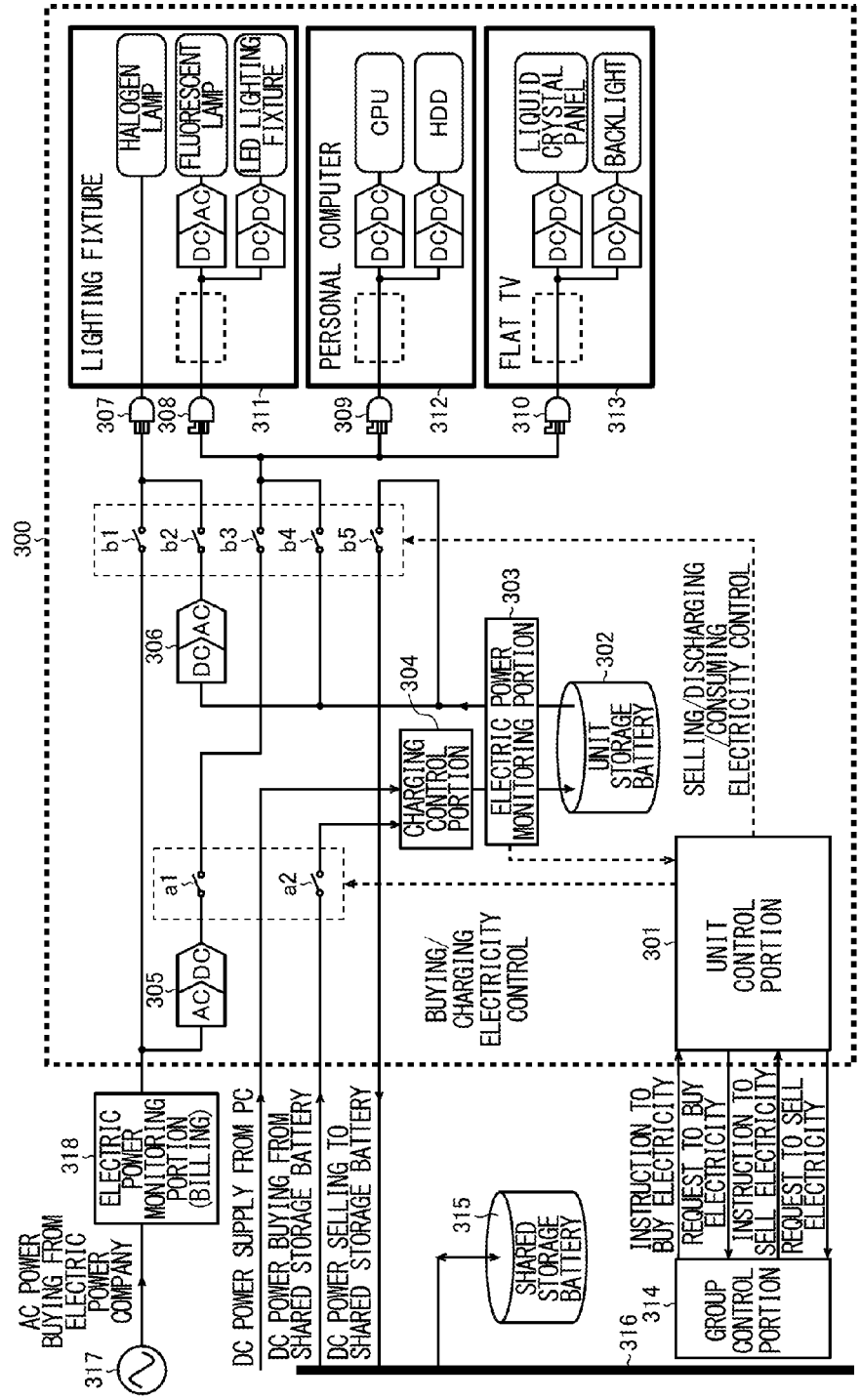

FIG.12

| STATE MONITORING PORTION / ELECTRIC POWER MONITORING PORTION | UNIT CONTROL PORTION | | GROUP CONTROL PORTION | | BUYING/ CHARGING ELECTRICITY SWITCH | | SELLING/DISCHARGING/ CONSUMING ELECTRICITY SWITCH | | | | | FEATURE | |
|---|---|---|---|---|---|---|---|---|---|---|---|---|---|
| | REQUEST TO BUY ELECTRICITY | REQUEST TO SELL ELECTRICITY | INSTRUCTION TO BUY ELECTRICITY | INSTRUCTION TO SELL ELECTRICITY | a1 | a2 | b1 | b2 | b3 | b4 | b5 | MERIT | DEMERIT |
| (1) ELECTRIC POWER SURPLUS | ABSENT | PRESENT | × | ○ | OFF | OFF | OFF | ON | OFF | ON | ON | SECURE ELECTRIC POWER ONLY BY PHOTOVOLTAIC POWER + INCOME FOR DC POWER SELLING | — |
| (2) ELECTRIC POWER SURPLUS | ABSENT | PRESENT | × | × | OFF | OFF | OFF | ON | OFF | ON | OFF | SECURE ELECTRIC POWER ONLY BY PHOTOVOLTAIC POWER | — |
| (3) ELECTRIC POWER SHORT | PRESENT | ABSENT | ○ | × | OFF | ON | OFF | OFF | OFF | ON | OFF | EFFECTIVE USE OF SHARED DC ELECTRIC POWER | PAYMENT FOR DC POWER BUYING |
| (4) ELECTRIC POWER SHORT | PRESENT | ABSENT | × | × | ON | OFF | ON | OFF | ON | OFF | OFF | SECURE MINIMUM ELECTRIC POWER | PAYMENT FOR AC POWER BUYING ELECTRIC POWER LOSS DUE TO AC/DC CONVERSION |

FIG.15

| STATE | ELECTRIC POWER MONITORING PORTION | GROUP CONTROL PORTION OF ITS OWN GROUP | | GROUP CONTROL PORTION OF HIGHER GROUP | | CHARGING SWITCH | | DISCHARGING SWITCH | |
|---|---|---|---|---|---|---|---|---|---|
| | | REQUEST TO CHARGE | REQUEST TO DISCHARGE | INSTRUCTION TO CHARGE | INSTRUCTION TO DISCHARGE | c1 | c2 | d1 | d2 |
| (1) | ELECTRIC POWER SURPLUS | ABSENT | PRESENT | × | ○ | OFF | — | ON | — |
| (2) | ELECTRIC POWER SURPLUS | ABSENT | PRESENT | × | × | OFF | — | OFF | — |
| (3) | ELECTRIC POWER SHORT | PRESENT | ABSENT | ○ | × | ON | — | OFF | — |
| (4) | ELECTRIC POWER SHORT | PRESENT | ABSENT | × | × | OFF | — | OFF | — |

FIG.17

| STATE | ELECTRIC POWER MONITORING PORTION | GROUP CONTROL PORTION OF LOWER GROUP | | GROUP CONTROL PORTION OF ITS OWN GROUP | | CHARGING SWITCH | | DISCHARGE SWITCH | |
|---|---|---|---|---|---|---|---|---|---|
| | | REQUEST TO CHARGE | REQUEST TO DISCHARGE | INSTRUCTION TO CHARGE | INSTRUCTION TO DISCHARGE | c1 | c2 | d1 | d2 |
| (1) | ELECTRIC POWER SURPLUS | ABSENT | PRESENT | × | ○ | — | ON | — | OFF |
| (2) | ELECTRIC POWER SURPLUS | PRESENT | ABSENT | ○ | × | — | OFF | — | ON |
| (3) | ELECTRIC POWER SURPLUS | PRESENT | PRESENT | ○ | ○ | — | ON | — | ON |
| (4) | FULLY CHARGED | ABSENT | PRESENT | × | × | — | OFF | — | OFF |
| (5) | FULLY CHARGED | PRESENT | ABSENT | ○ | × | — | OFF | — | ON |
| (6) | FULLY CHARGED | PRESENT | PRESENT | ○ | × | — | OFF | — | ON |
| (7) | ELECTRIC POWER SHORT | ABSENT | PRESENT | × | ○ | — | ON | — | OFF |
| (8) | ELECTRIC POWER SHORT | PRESENT | ABSENT | × | × | — | OFF | — | OFF |
| (9) | ELECTRIC POWER SHORT | PRESENT | PRESENT | × | ○ | — | ON | — | OFF |

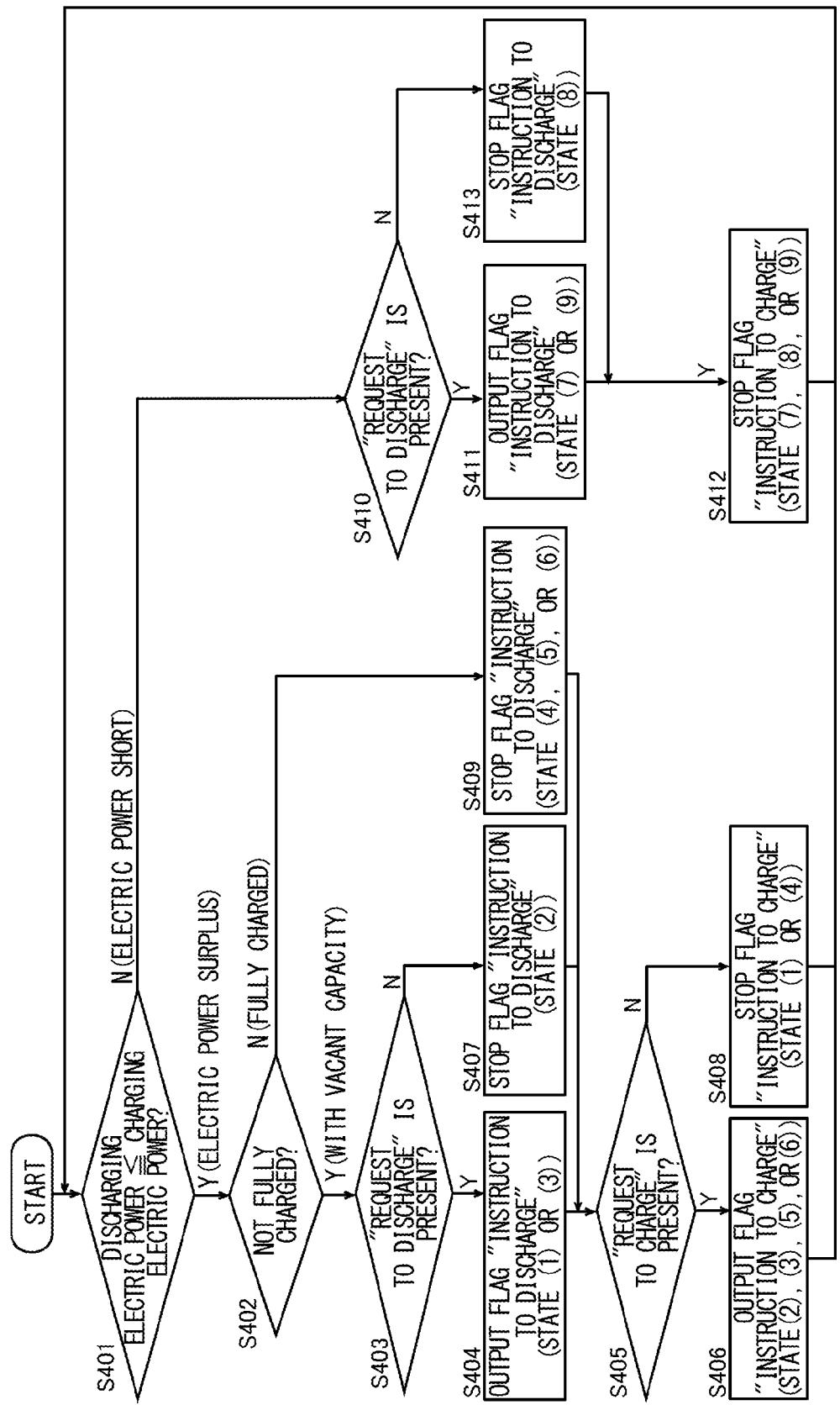

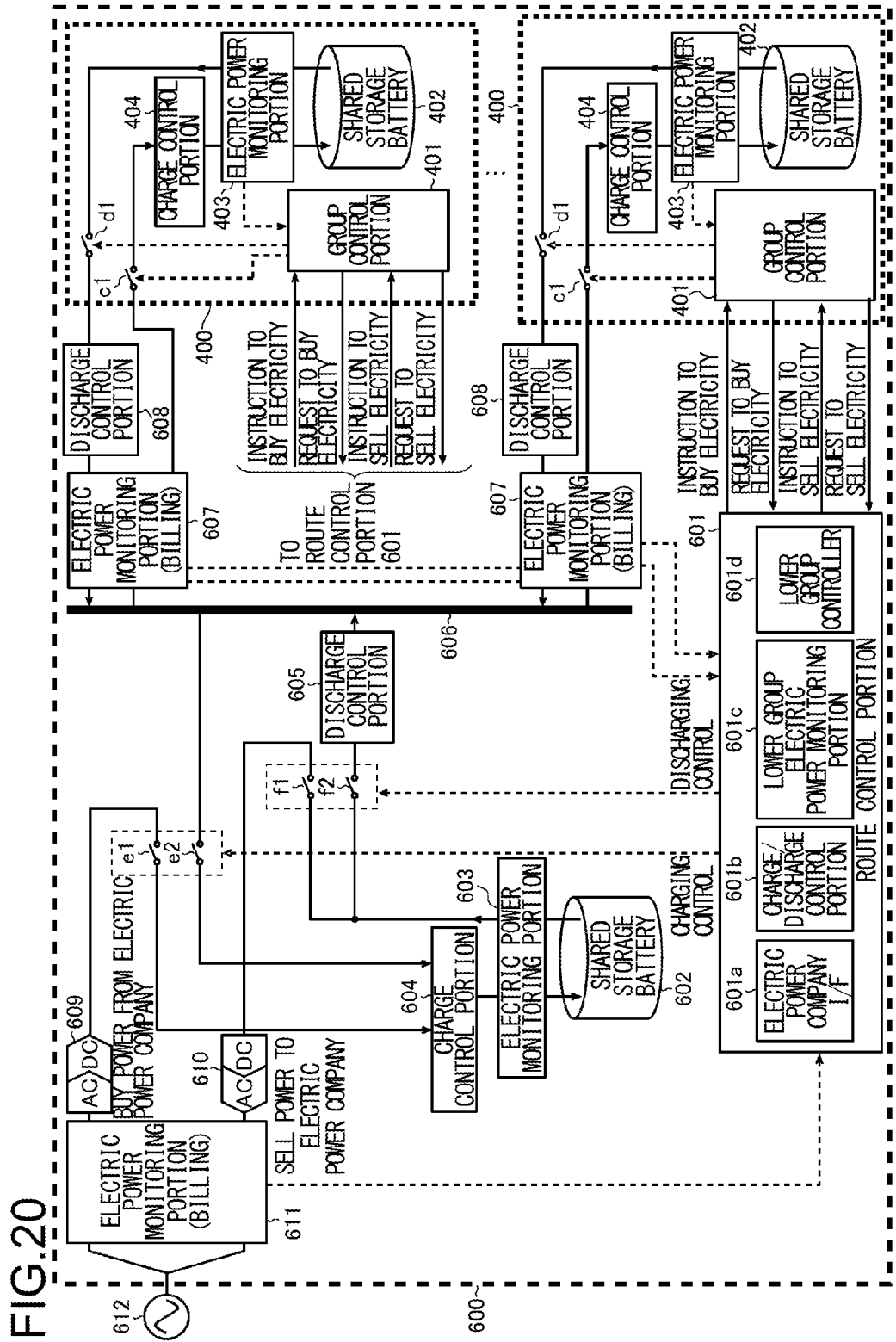

FIG.21

| STATE | ELECTRIC POWER MONITORING PORTION | GROUP CONTROL PORTION OF LOWER GROUP | | ROUTE CONTROL PORTION | | CHARGING SWITCH | | DISCHARGE SWITCH | | ELECTRIC POWER COMPANY |
|---|---|---|---|---|---|---|---|---|---|---|
| | | REQUEST TO CHARGE | REQUEST TO DISCHARGE | INSTRUCTION TO CHARGE | INSTRUCTION TO DISCHARGE | e1 | e2 | f1 | f2 | |
| (1) | SUBSTANTIALLY FULLY CHARGED (90% OR HIGHER) | ABSENT | PRESENT | × | ○ | OFF | OFF | ON | OFF | SELL POWER |
| (2) | SUBSTANTIALLY FULLY CHARGED (90% OR HIGHER) | PRESENT | ABSENT | ○ | × | OFF | ON | OFF | ON | — |
| (3) | SUBSTANTIALLY FULLY CHARGED (90% OR HIGHER) | PRESENT | PRESENT | ○ | ○ | OFF | ON | ON | ON | SELL POWER |
| (4) | STABLE (30~90%) | ABSENT | PRESENT | × | ○ | OFF | ON | OFF | OFF | — |
| (5) | STABLE (30~90%) | PRESENT | ABSENT | ○ | × | OFF | OFF | OFF | ON | — |
| (6) | STABLE (30~90%) | PRESENT | PRESENT | ○ | ○ | OFF | ON | OFF | ON | — |
| (7) | ELECTRIC POWER SHORT (30% OR LOWER) | ABSENT | PRESENT | × | ○ | OFF | ON | OFF | OFF | — |
| (8) | ELECTRIC POWER SHORT (30% OR LOWER) | PRESENT | ABSENT | × | × | ON | OFF | OFF | OFF | BUY POWER |
| (9) | ELECTRIC POWER SHORT (30% OR LOWER) | PRESENT | PRESENT | × | ○ | ON | ON | OFF | OFF | BUY POWER |

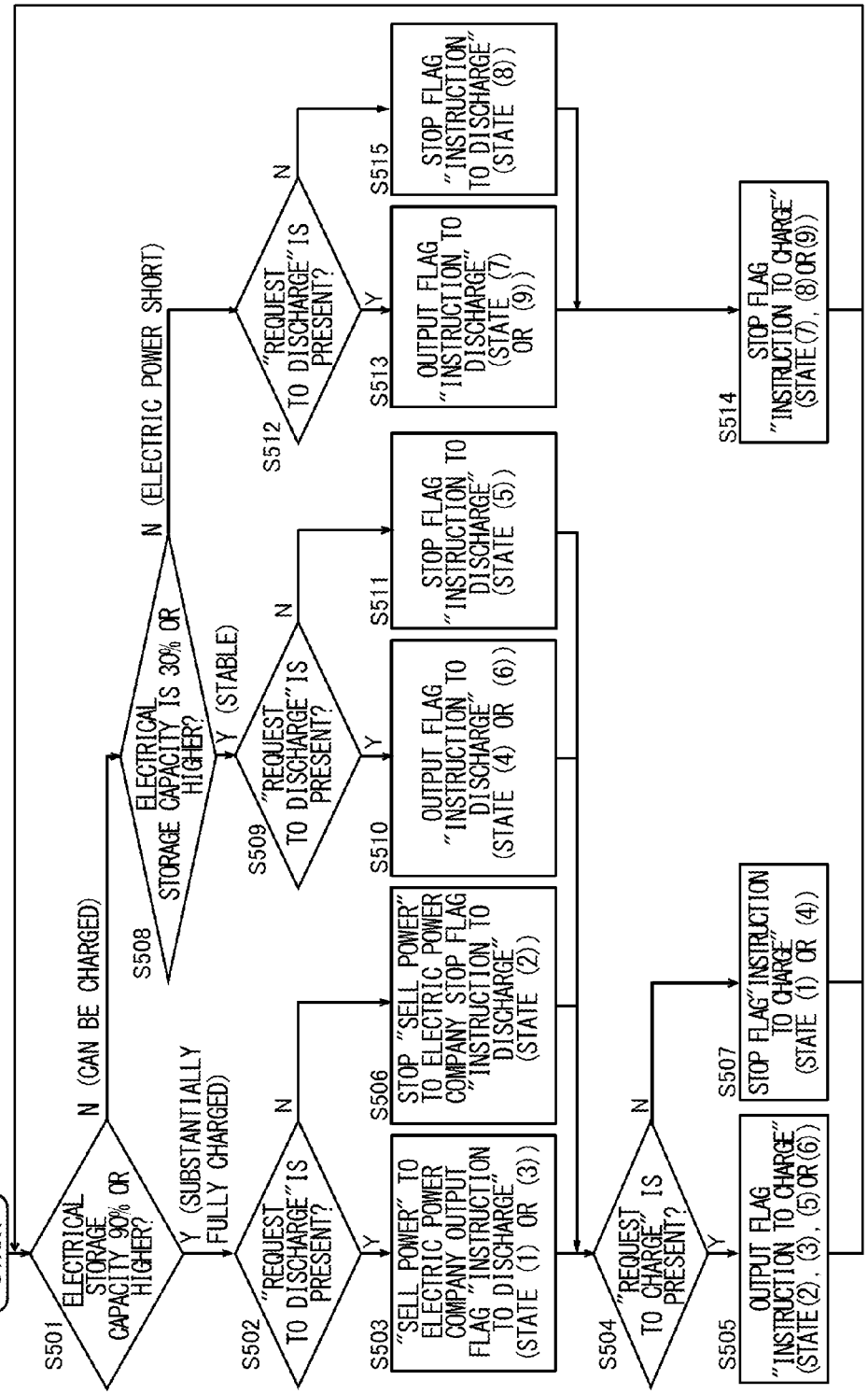

POWER SYSTEM

TECHNICAL FIELD

The present invention relates to an electric power system.

BACKGROUND ART

Regarding electric power supply, various proposals are presented from a viewpoint of environmental load reduction. For instance, Patent Document 1 discloses a photovoltaic power generation system constituted of solar cells, a storage battery, and an interconnection inverter having a self sustaining function, which is operated as an interconnection photovoltaic power generation system when the system power supply is normal, and in a disaster situation the inverter is operated in a self sustaining mode using the solar cells and the storage battery as power sources so as to supply electric power to a specific load. In this photovoltaic power generation system, the inverter has a bidirectional function, and supplemental charging of the storage battery is performed with the system side electric power by operating the inverter in a converter mode when the system power supply is normal. It is also proposed that the supplemental charging of the storage battery should be performed after the interconnection photovoltaic power generation operation is stopped, and further that the supplemental charging of the storage battery should be performed during a time slot to which a midnight power rate is applied. In addition, Patent Document 2 proposes an electric power selling system by the photovoltaic power generation.

PRIOR ART DOCUMENTS

Patent Documents

Patent Document 1: JP-A-11-127546
Patent Document 2: JP-A-2008-202983

DISCLOSURE OF THE INVENTION

Problem to be Solved by the Invention

However, regarding the electric power system, there are still various problems to be studied from a viewpoint of environmental load reduction.

In view of the above-mentioned problem, it is an object of the present invention to provide an electric power system that can contribute to environmental load reduction.

Means for Solving the Problem

In order to solve the above-mentioned problem, an electric power system of the present invention includes a first unit equipped with a first power source, a first rechargeable battery to which an output of the first power source is input, and a first power consuming portion to which an output of the first rechargeable battery is input; a second rechargeable battery; and an electric power line for sharing electric power between the first rechargeable battery and the second rechargeable battery (first structure).

Note that it is preferred that the electric power system according to the first structure should include a second unit equipped with a second power source, the second rechargeable battery to which an output of the second power source is input, and a second power consuming portion to which an output of the second rechargeable battery is input (second structure).

In addition, in the electric power system having the second structure, it is preferred that the first and second power sources should be solar panels (third structure).

In addition, in the electric power system having the second structure, it is preferred that the first and second power sources should be commercial electric power (fourth structure).

In addition, it is preferred that the electric power system having the third structure should further include a first electric power converting portion that converts an output from the commercial electric power into DC power and outputs the DC power to the first rechargeable battery (fifth structure).

In addition, in the electric power system having the second structure, it is preferred that the first power consuming portion should include a DC power consuming portion (sixth structure).

In addition, in the electric power system having the sixth structure, it is preferred that the DC power consuming portion should be an LED lighting fixture (seventh structure).

In addition, in the electric power system having the second structure, it is preferred that the first power consuming portion should have an AC power consuming portion (eighth structure).

In addition, it is preferred that the electric power system having the eighth structure should further include a second electric power converting portion that converts an output from the first rechargeable battery into AC power and outputs the AC power to the AC power consuming portion (ninth structure).

In addition, it is preferred that the electric power system having any one of the second to ninth structures should further include a third rechargeable battery that is connected to the electric power line and can interchange electric power with the first and second rechargeable batteries (tenth structure).

Effects of the Invention

As described above, according to the present invention, it is possible to provide the electric power system that can contribute to environmental load reduction by interchanging electric power among a plurality of storage batteries.

BRIEF DESCRIPTION OF THE DRAWINGS

FIG. 2 is a table showing states of switches controlled by a control portion of FIG. 1.

FIG. 4 is a schematic diagram of electric power charged in the storage battery concerning electric power interchange among a plurality of homes.

FIG. 11 is a schematic diagram illustrating a structural example of a unit.

FIG. 12 is an operation list of a unit control portion.

FIG. 15 is an operation list of a group control portion with respect to a higher group.

FIG. 17 is an operation list of the group control portion with respect to a lower group.

FIG. 18 is an operation flowchart of the group control portion with respect to the lower group.

FIG. 20 is a schematic diagram illustrating a structural example of a route.

FIG. 21 is an operation list of a route control portion.

FIG. 22 is an operation flowchart of the route control portion.

BEST MODE FOR CARRYING OUT THE INVENTION

First Example

Figure 1:
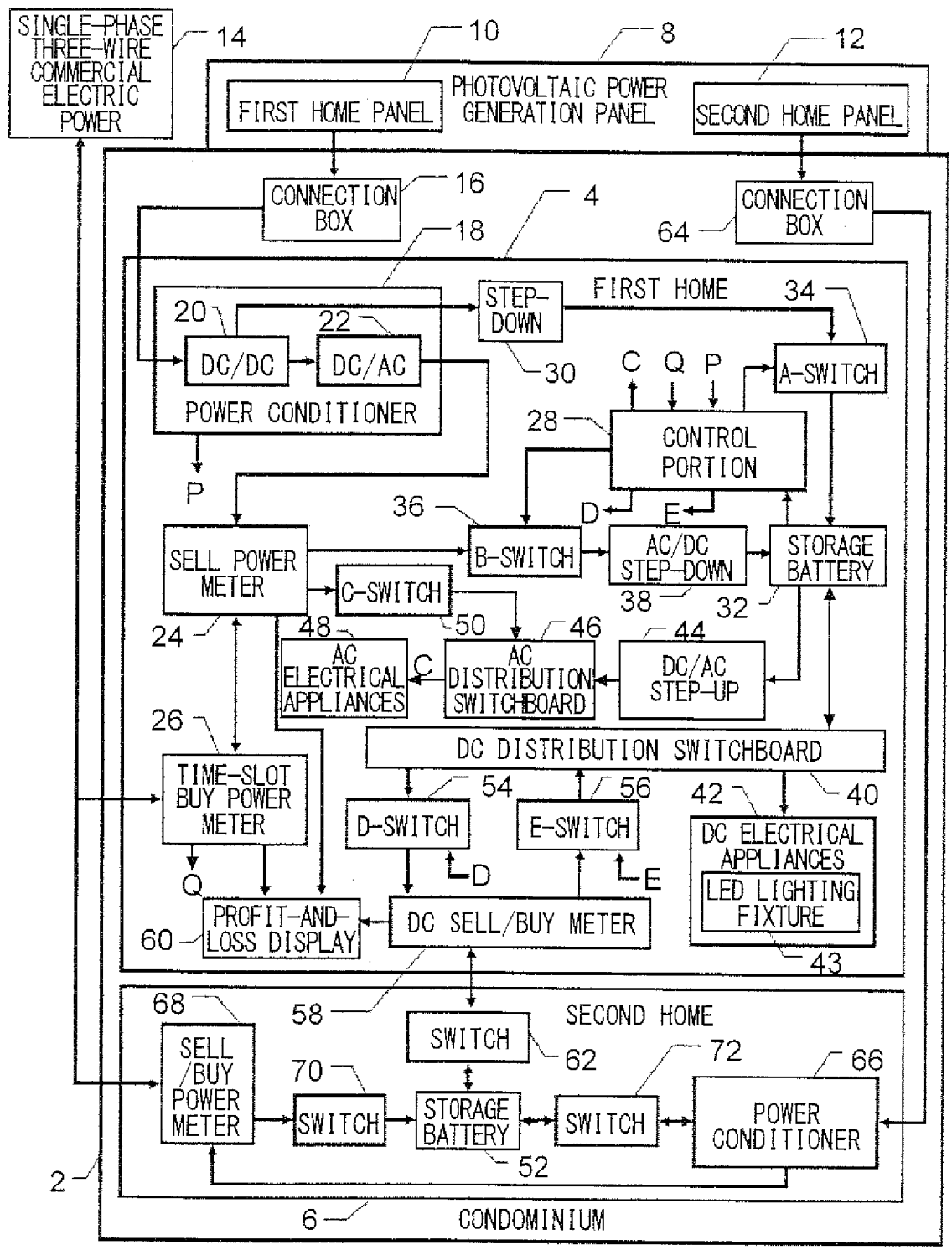
FIG. 1 is a block diagram of an electric power supply system according to an embodiment of the present invention (first example).

FIG. 1 is a block diagram of an electric power supply system according to an embodiment of the present invention. A first example is constituted as a multiple dwelling house such as a condominium 2. In FIG. 1, a first home 4 and a second home 6 are illustrated as representatives of dwelling homes for simple illustration, but in reality many similar homes are dwelling in the condominium 2. On the rooftop of the condominium 2, there are disposed a photovoltaic power generation panel 8, which is divided and sold as a first home panel 10, a second home panel 12, and so on. In addition, in the condominium 2, AC power lines are drawn in the dwelling homes from a single-phase three-wire commercial electric power 14.

Next, a detailed structure of the electric power supply system of the first example is described with reference to the first home 4 as an example. The first home panel 10 of the solar cell panel 8 is connected to a power conditioner 18 for the first home via a connection box 16 reserved for the first home. The power conditioner 18 includes a DC/DC converter 20 that converts DC electric power from the connection box 16 into the most effective voltage, and a DC/AC converter 22 that converts the same into AC electric power whose voltage is set a little higher than the highest voltage of the commercial AC power level. A photovoltaic generation AC electric power output from the DC/AC converter 22 is connected to a sell power meter 24 and is sold to the single-phase three-wire commercial electric power 14 side via the sell power meter 24 and a time-slot buy power meter 26. A price of the selling power is two times the usual buying power price. Note that the single-phase three-wire commercial electric power 14 can be usually supplied to the first home 4 via the time-slot buy power meter 26 and the sell power meter 24 as buying power when the photovoltaic power generation panel 8 cannot generate electric power or as buying power at the midnight power rate.

A control portion 28 controls various switches disposed in the system. Then, power generating state information of the power conditioner 18 and state information of the time-slot buy power meter 26, which are necessary for the control, are input via connections denoted by P and Q in FIG. 1. The control portion 28 first controls an A-switch 34 disposed in a charging path connected from a DC/DC converter 20 of the power conditioner 18 to a storage battery 32 via a step-down portion 30. Further, during daytime, if stored electricity in the storage battery 32 is short, the A-switch 34 is closed so that supplemental charging is performed by electric power generated by the photovoltaic power generation panel 8. The storage battery 32 is provided basically for the purpose of storing electric power bought at the midnight power rate from the single-phase three-wire commercial electric power 14 and using the stored electric power in the first home 4 during time other than the time slot of the midnight power rate. For this purpose, the control portion 28 controls a B-switch 36 connected to the sell power meter 24 to be closed in the midnight power rate time slot so that the storage battery 32 is charged via an AC/DC converter and a step-down portion 38. Note that the midnight power rate is set to ⅓ of the normal rate.

The electric power stored in the storage battery 32 is supplied to DC electrical appliances 42 via a DC distribution switchboard 40. The DC electrical appliances 42 include an LED lighting fixture 43 and the like. The electric power stored in the storage battery 32 is further supplied to AC electrical appliances 48 from AC distribution switchboard 46 via a DC/AC converter and a step-up portion 44. The AC electrical appliances 48 are general home appliances supplied with power from a normal home outlet. Note that in order to drive the AC electrical appliances 48 directly by the single-phase three-wire commercial electric power 14 during midnight power rate time slot or when electric power in the storage battery 32 is short during time other than the midnight power rate time slot, the control portion 28 controls to close a C-switch 50 connected between the sell power meter 24 and the AC distribution switchboard 46.

The second home 6 has the same structure as the first home 4, but for simple illustration, only typical elements are illustrated while other elements are omitted. As apparent from FIG. 1, the second home 6 is equipped with a storage battery 52 similar to the storage battery 32 of the first home 4, and interchange of charged electric power can be performed between the storage batteries. A price for the interchange is approximately the midnight power rate from the single-phase three-wire commercial electric power 14 plus loss costs in the conversion between AC and DC, and in charging and discharging the storage batteries 32 and 52, which is largely lower than the normal electric power rate. For this purpose, a D-switch 54 for selling DC power and an E-switch 56 for buying DC power are connected to the DC distribution switchboard 40, and are connected to the second home 6 via a DC sell/buy meter 58. The sell power meter 24, the time-slot buy power meter 26, and the DC sell/buy meter 58 are connected to a profit-and-loss display portion 60, which displays profit and loss in selling and buying power.

A switch 62 in the second home 6 for DC electric power interchange with the first home 4 has the same structure as the D-switch 54 and the E-switch 56 for buying DC power in the first home 4, which are integrated for illustration. Note that the DC sell/buy meter of the second home 6 is not illustrated. The selling and buying of DC power is not actually a bilateral trade between the first home 4 and the second home 6 but a one-to-many trade among all dwelling homes in the condominium 2. Therefore, individual homes are connected to a common DC line. As described above, the second home 6 and other homes (not shown) have the same structure as the first home 4. Main structure of the second home 6 is as follows. The second home panel 12 of the photovoltaic power generation panel 8 is connected to a power conditioner 66 via a connection box 64. A sell/buy power meter 68 is the same as the sell power meter 24 and the time-slot buy power meter 26 in the first home 4, which are integrated for illustration. Then, the AC electric power bought via the sell/buy power meter 68 charges the storage battery 52 via a switch 70. The AC/DC converter and the step-down portion are not illustrated. The photovoltaic power generation electric power from the power conditioner 66 is sold via the sell/buy power meter 68 and charges the storage battery 52 via a switch 72. The step-down portion is not illustrated. Other detailed description and illustration are omitted, but the second home 6 has the same structure as the first home 4.

FIG. 2 shows states of the switches controlled by the control portion 28. FIG. 2(A) is concerning the A-switch 34, the B-switch 36, and the C-switch 50. FIG. 2(B) is concerning the D-switch 54 and the E-switch 56. As apparent from FIG. 2(A), the A-switch 34 for charging the storage battery 32 with the photovoltaic power generation electric power is closed if there is the photovoltaic power generation electric power and the electric power stored in the storage battery 32 is short, and is opened in other cases. Note that in FIG. 2(A), the parenthesized ON like "(ON)" means a case where the switch is supplementally closed. In other words, as described above, charging of the storage battery 32 is usually performed from the single-phase three-wire commercial electric power 14 at the midnight power rate, and the charging via the A-switch 34 is performed only supplementally in a case where electric power in the storage battery 32 is short during time other than the midnight power rate time slot.

The B-switch 36 is closed for charging the storage battery 32 from the single-phase three-wire commercial electric power 14 during the midnight power rate time slot, and is supplementally closed when electric power in the storage battery 32 is short during time after sunset without photovoltaic power generation before the midnight power rate time slot. The B-switch 36 is opened in other situations. On the other hand, the C-switch 50 is closed for driving the AC electrical appliances 48 by directly consuming electric power from the single-phase three-wire commercial electric power 14 during the midnight power rate time slot. This is because during the midnight power rate time slot, it is more efficient without power loss to drive directly than the drive via the B-switch 36 and the storage battery 32. The C-switch 50 is further closed supplementally when electric power stored in the storage battery 32 is short regardless of presence or absence of the photovoltaic power generation.

In addition, as apparent from FIG. 2(B), the D-switch 54 for selling DC electric power from the storage battery 32 to other home and the E-switch 56 for buying DC electric power from other home to charge the storage battery 32 are closed first during the midnight power rate time slot. This is because during the midnight power rate time slot, the storage batteries of individual homes are considered as one virtual large storage battery beyond fences among homes so that low-cost electric power storage can be performed together as much as possible and electric power interchange can be performed to a home having a free capacity. Note that the storage battery 32 may be charged not only from electric power of the midnight power rate but also from electric power of the photovoltaic power generation at high cost and electric power bought during the normal time slot. If such electric power charged at high cost is used for interchange with other home at a rate similarly to the midnight power rate, confusion may occur in accounting of the electric power interchange. Therefore, in this example, among electric power stored in the storage battery 32, electric power charged at high cost is excluded, and only the electric power charged by buying power at the midnight power rate is interchanged with other home only if there is a surplus thereof.

In FIG. 2(B), according to the concept described above, switch control during time other than the midnight power rate time slot is performed. First, the D-switch 54 for buying DC electric power from the storage battery 32 to other home is closed only in a case where electric power charged in the storage battery 32 is sufficient and there is a margin of electric power bought at the midnight power rate, and is opened in other cases. On the other hand, the E-switch 56 for buying DC electric power from other home to charge the storage battery 32 is closed in a case where electric power charged in the storage battery 32 is short, and is opened in other cases.

FIG. 3 is a schematic diagram of stored electric power illustrating sufficiency or shortage of electric power in the storage battery 32, and the above-mentioned surplus of bought DC electric power. FIGS. 3(A) and 3(B) illustrate examples where the stored electricity in a capacity 102 of the storage battery 32 is constituted of only electric power 104 bought at the midnight power rate. Here, in FIG. 3(A), the electric power 104 bought at the midnight power rate includes the surplus exceeding a line 106 of electric power that can be consumed until the next midnight power rate time slot. In this case, it is not necessary to charge the storage battery 32 during time other than the midnight power rate time slot, and the surplus electric power can be sold to other home. In contrast, in FIG. 3(B), the stored electricity by the electric power 104 bought at the midnight power rate is below the line 106 of electric power that can be consumed until the next midnight power rate time slot. In this case, it is necessary to charge the storage battery 32 by the next midnight power rate time slot. Further, as a matter of course, there is no surplus that can be sold to other home.

Figure 3A:
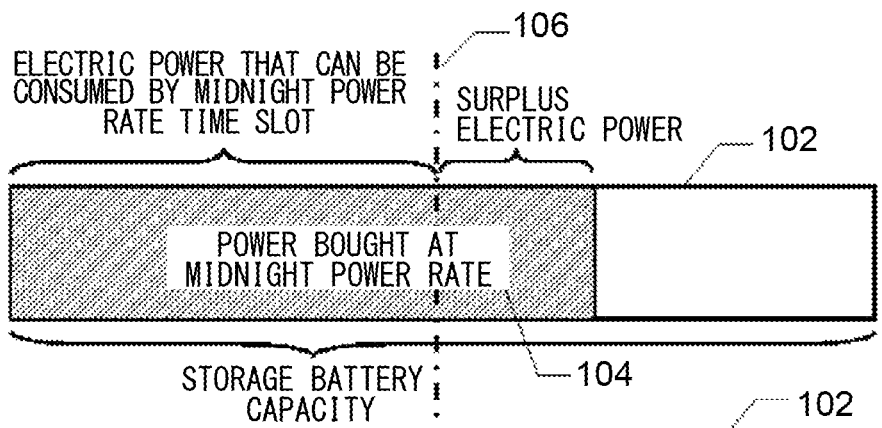
FIG. 3 is a schematic diagram of electric power charged in a storage battery of FIG. 1.
Figure 3B:
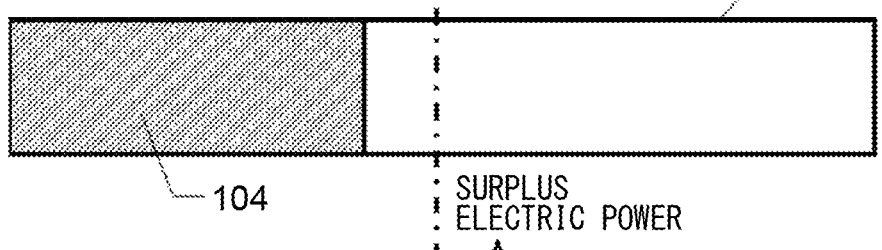
Figure 3C:
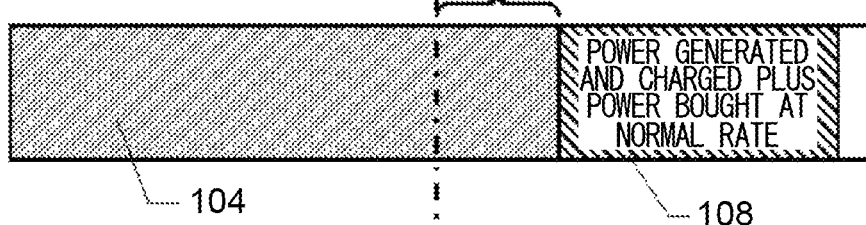
Figure 3D:
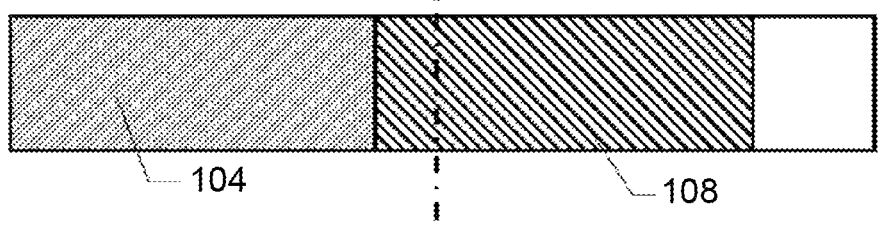
Figure 3E:
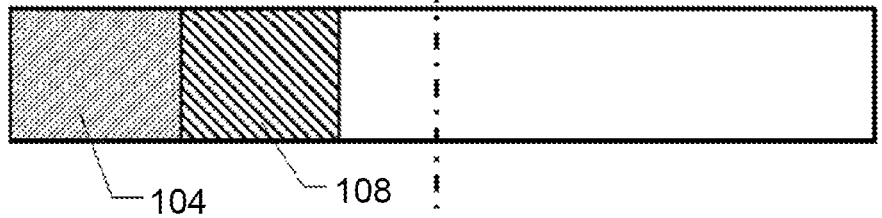

In contrast, FIGS. 3(C) to 3(E) illustrate examples in which the stored electricity in the capacity 102 of the storage battery 32 is constituted of the electric power 104 bought at the midnight power rate and electric power 108 of high cost generation plus normal rate buy. Here, in FIG. 3(C), only the electric power 104 bought at the midnight power rate exceeds the line 106 of electric power that can be consumed until the next midnight power rate time slot, and the total stored electricity also exceeds the line 106 as a matter of course. Therefore, it is not necessary to charge the storage battery 32 during time other than the midnight power rate time slot. It should be noted that the surplus electric power that can be sold to other home is not all the electric power part exceeding the line 106 but a part after subtracting the electric power 108 of high cost generation plus normal rate buy from the same.

On the other hand, in FIG. 3(D), the electric power 104 bought at the midnight power rate is below the line 106 of electric power that can be consumed until the next midnight power rate time slot, and the total electric power after adding the electric power 108 of high cost generation plus normal rate buy to the same exceeds the line 106. In this state, it is not necessary to charge the storage battery 32 during time other than the midnight power rate time slot, but there is no surplus electric power that can be sold to other home. In FIG. 3(E), the electric power 104 bought at the midnight power rate is below the line 106 of electric power that can be consumed until the next midnight power rate time slot, and the total electric power after adding the electric power 108 of high cost generation plus normal rate buy to the same is also below the line 106. In this state, it is necessary to further charge the storage battery 32 with the high-cost power source during time other than the midnight power rate time slot. As a matter of course, there is no surplus electric power that can be sold to other home.

FIG. 4 is a schematic diagram of charged electric power illustrating interchange of electric power bought at midnight power rate, in which a part having the same meaning as in FIG. 3 is denoted by the same numeral. In addition, FIG. 4(A1) illustrates a structure of electric power charged in the storage battery 32 of the first home 4, and FIG. 4(A2) illustrates a structure of electric power charged in the storage battery 52 of the second home 6. Further, FIGS. 4(A1) and 4(A2) illustrate a case without the interchange of the stored electric power. As apparent from FIG. 4(A1), in the first home 4, the stored electricity in the capacity 102 of the storage battery 32 is constituted of only the electric power 104 bought at the midnight power rate. Further, because the stored electricity exceeds the line 106 of electric power that can be consumed until the next midnight power rate time slot, it is not necessary to charge the storage battery 32 during time other than the midnight power rate time slot. On the other hand, the stored electricity in the storage battery 52 of the second home 6 is constituted of the electric power 104 bought at the midnight power rate and the electric power 108 of high cost generation plus normal rate buy. Further, the electric power 104 bought at the midnight power rate is below the line 106 of electric power that can be consumed until the next midnight power rate time slot, but the total electric power after adding the electric power 108 of high cost generation plus normal rate buy to the same exceeds the line 106. Therefore, similarly to the first home 4, it is not necessary to charge the storage battery 32 during time other than the midnight power rate time slot. However, the electric power that will be consumed by the next midnight power rate time slot in the second home 6 contains high-cost electric power so that the cost is increased.

In contrast, FIG. 4(B1) illustrates the structure of electric power charged in the storage battery 32 of the first home 4, and FIG. 4(B2) illustrates the structure of electric power charged in the storage battery 52 of the second home 6, in which the electric power interchange is performed. As apparent from FIG. 4(B1), a sold electric power 112 out of the surplus electric power of the first home 4 is bought by the second home 6 as illustrated by an arrow 114, so as to charge the storage battery 52 as a bought electric power 116 as illustrated in FIG. 4(B2). Thus, the structure of electric power in the storage battery 52 of the second home 6 in FIG. 4(B2) is constituted of the electric power 104 bought at the midnight power rate plus the bought electric power 116 from the first home 4. Thus, each of them has a low-cost structure at substantially the midnight power rate. In this way, by interchanging electric power bought at the midnight power rate among a plurality of homes, low-cost electric power procurement can be realized as a whole.

Figure 5:
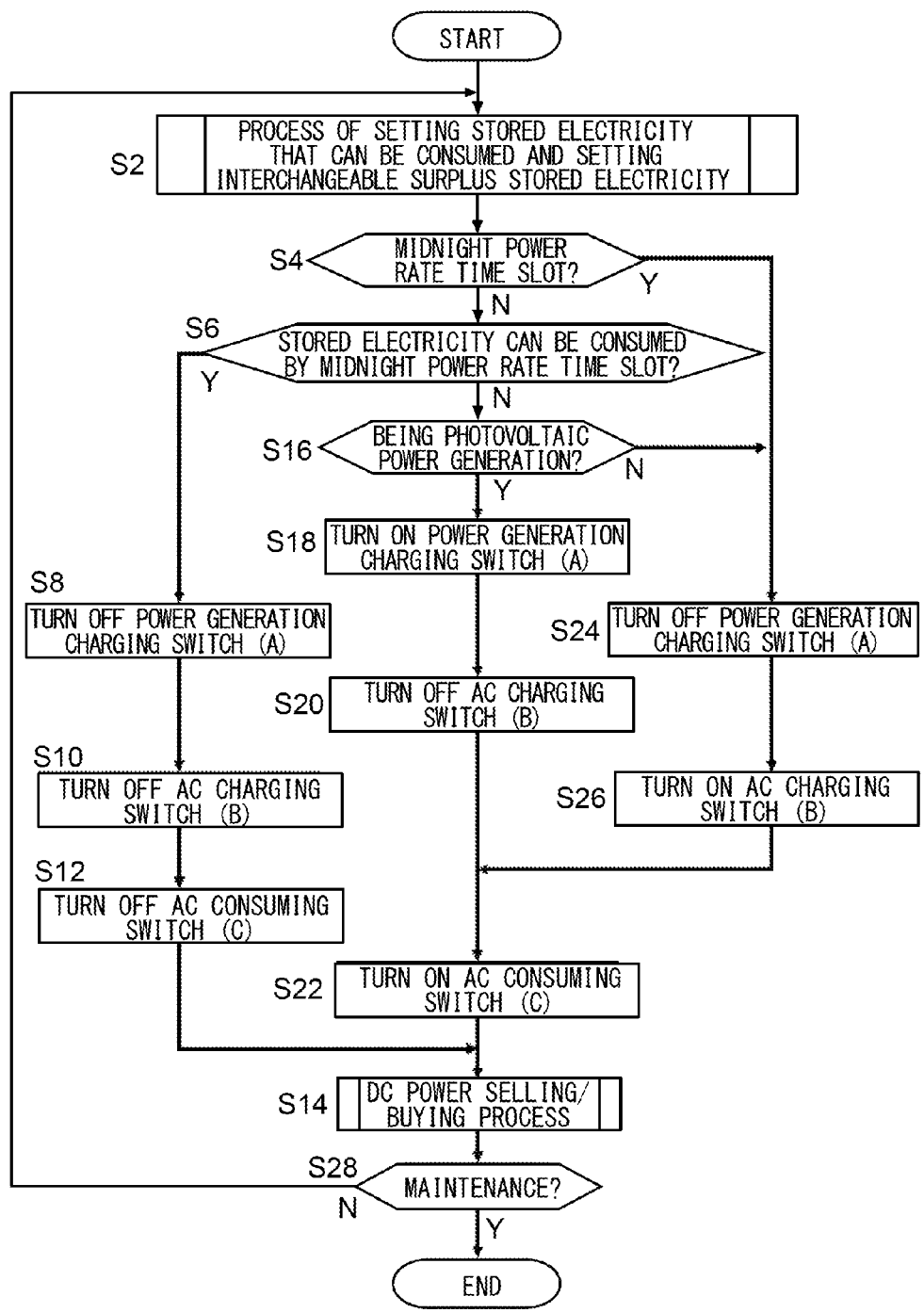
FIG. 5 is a basic flowchart illustrating switch control function of the control portion of FIG. 1.

FIG. 5 is a basic flowchart illustrating switch control function of the control portion 28 of FIG. 1 according to the first example of the present invention. The flow starts when the system is installed. First in Step S2, the stored electricity that can be consumed in the own home by the next midnight power rate time slot and the surplus stored electricity that can be interchanged to other home by the next midnight power rate time slot are set. Details of the process will be described later. Next in Step S4, it is checked whether or not the present time is in the midnight power rate time slot. If it is not the midnight power rate time slot, the process goes to Step S6, and it is checked whether or not the stored electricity in the storage battery 32 is equal or larger than the electricity that can be consumed in the own home by the next midnight power rate time slot.

If it is decided in Step S6 that there is the stored electricity that can be consumed by the next midnight power rate time slot, the process goes to Step S8 in which the A-switch 34 for charging by the photovoltaic power generation is opened. Then, the process goes to Step S10, and the B-switch 36 for charging with the AC electric power from the single-phase three-wire commercial electric power 14 is opened. Further in Step S12, the C-switch 50 for directly consuming the AC electric power from the single-phase three-wire commercial electric power 14 is opened, and the process goes to Step S14. In this way, if the stored electricity in the storage battery 32 is equal or larger than the electricity that can be consumed in the own home by the next midnight power rate time slot, the electric power is consumed entirely from the electric power of the storage battery. This is applied not only to the DC electrical appliances 42 but also to the AC electrical appliances 48. Therefore, if there is the photovoltaic power generation electric power, by opening the switch for buying power, all the generated power is sold so as to make twice profit.

On the other hand, if it is decided in Step S6 that there is shortage of the stored electricity that can be consumed by the next midnight power rate time slot, the process goes to Step S16 in which it is checked whether or not the photovoltaic power is being generated. Then, if the photovoltaic power is being generated, the process goes to Step S18 in which the A-switch 34 for charging by photovoltaic power generation is closed. Further in Step S20, the B-switch 36 for charging with the AC electric power from the single-phase three-wire commercial electric power 14 is opened. Thus, the charging of the shortage is performed only by the photovoltaic power generation electric power during the photovoltaic power generation. Further in Step S22, the C-switch 50 for directly consuming the AC electric power from the single-phase three-wire commercial electric power 14 is closed, and the process goes to Step S14. The C-switch 50 is closed because it is economical for direct consuming to consume the AC electric power bought at the normal rate than consuming the electric power of the photovoltaic power generation that can be sold for twice price.

In addition, if it is checked in Step S4 that the present time is in the midnight power rate time slot, the process goes to Step S24 in which the A-switch 34 for charging with the photovoltaic power generation that is not currently performed is opened. Further in Step S26, the B-switch 36 for charging with the AC electric power from the single-phase three-wire commercial electric power 14 is closed to buy the AC electric power from the single-phase three-wire commercial electric power 14 at the midnight power rate so that the storage battery 32 can be charged. Then, the process goes to Step S22 in which the C-switch 50 is closed so that the AC electric power from the single-phase three-wire commercial electric power 14 can be directly consumed at the midnight power rate, and the process goes to Step S14.

In Step S14, DC sell/buy process of the storage battery 32 with other home is performed, and the process goes to Step S28. Details of Step S14 will be described later. In Step S28, presence or absence of maintenance operation of the system due to coming of the regular maintenance time or manual operation is checked. If there is no detection of either operation, the process goes back to Step S2. After that, as long as there is no maintenance detection is performed in Step S28, Steps S2 to S28 are repeated so that the switches are controlled in accordance with various situations.

Figure 6:
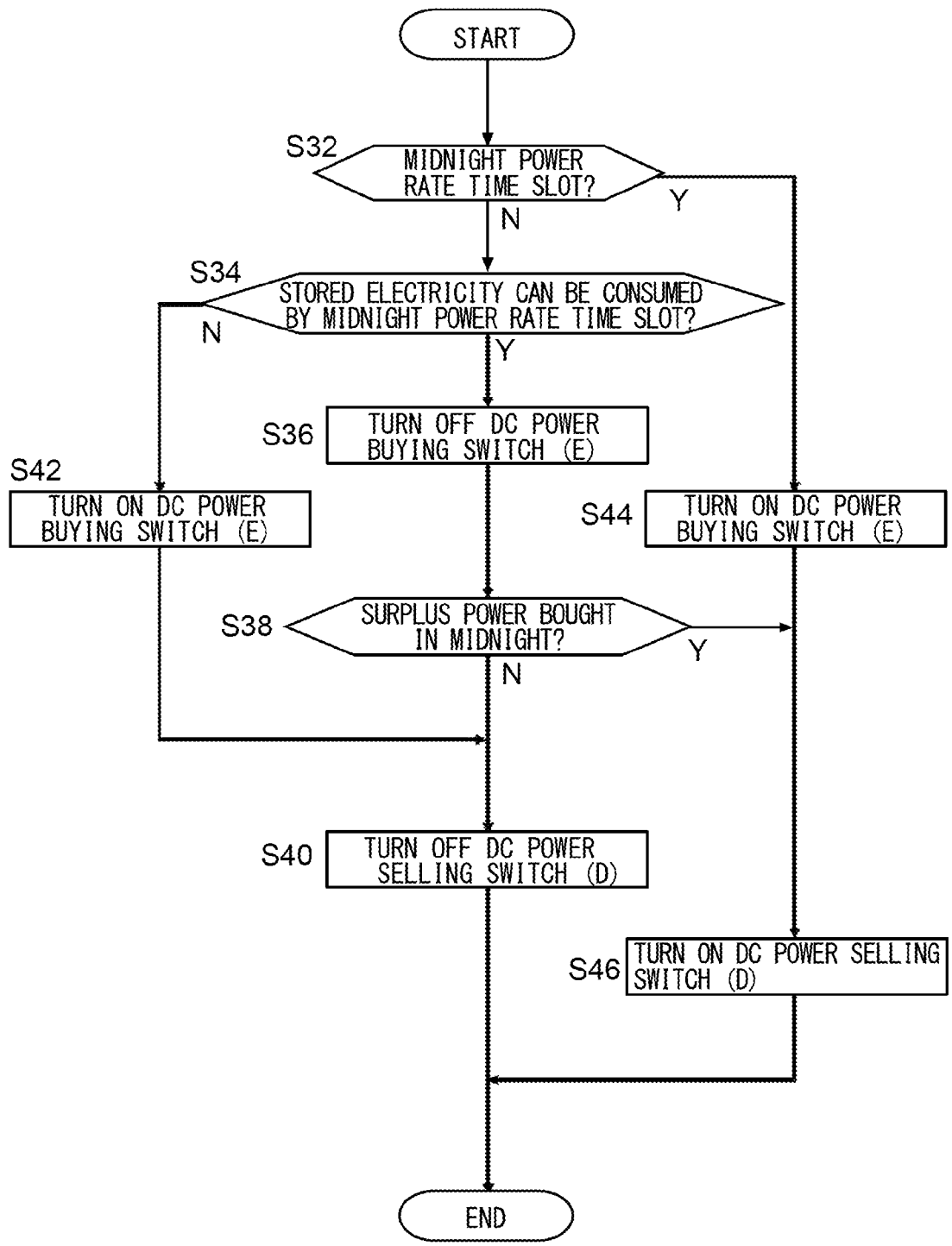
FIG. 6 is a flowchart illustrating details of Step S14 in FIG. 5.

FIG. 6 is a flowchart illustrating details of the DC sell/buy process in Step S14 of FIG. 5. When the flow starts, it is checked in Step S32 whether or not the present time is in the midnight power rate time slot. If it is not in the midnight power rate time slot, the process goes to Step S34, and it is checked whether or not the stored electricity in the storage battery 32 is equal or larger than the electricity that can be consumed in the own home by the next midnight power rate time slot. If the result is true, the process goes to Step S36 because it is not necessary to buy power. Then, the E-switch 56 for buying DC power is opened, and the process goes to Step S38. In Step S38, it is checked whether or not there is surplus stored electricity by electric power bought at the midnight power rate that can be interchanged to other home by the next midnight power rate time slot. If there is no surplus, the process goes to Step S40 in which the D-switch 54 for selling DC power is opened, and the flow is finished.

On the other hand, if it is checked in Step S34 that the stored electricity in the storage battery 32 is smaller than the electricity that can be consumed in the own home by the next midnight power rate time slot, the process goes to Step S42 in which the E-switch 56 for buying DC power is closed so that DC power can be bought from other home. Then, because there is no surplus power for selling as a matter of course, the process goes to Step S40 in which the D-switch 54 for selling DC power is opened, and the flow is finished. Further, if it is checked in Step S32 that the present time is in the midnight power rate time slot, the process goes to Step S44, in which the E-switch 56 for buying DC power is closed so that electric power can be bought from other home. In addition, in Step S46, the D-switch 54 for selling DC power is closed so that electric power can be sold to other home. In this way, during the midnight power rate time slot, DC electric power can be sold and bought freely. Note that if it is checked in Step S38 that there is surplus stored electricity by power bought at the midnight power rate that can be interchanged to other home by the next midnight power rate time slot, the process goes to Step S46 in which the D-switch 54 for selling DC power is closed, and the flow is finished. In this way, during time other than the midnight power rate time slot, electric power can be sold only if there is surplus charge electric power bought at the midnight power rate. Even if there is charge electric power that can be consumed by the next midnight power rate time slot, if there is no surplus after subtracting power charged by high-cost power, interchange to other home is not performed.

Figure 7:
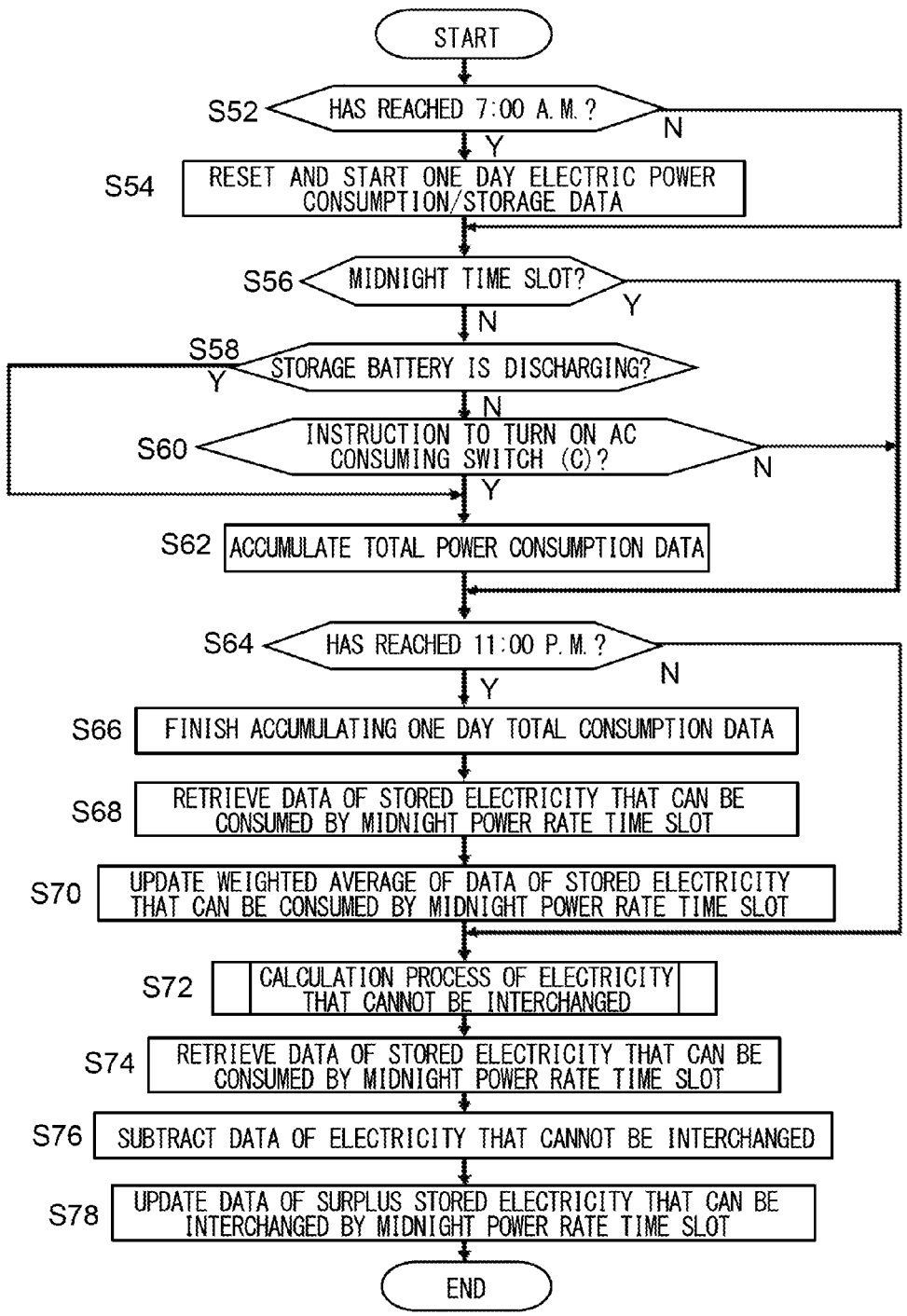
FIG. 7 is a flowchart illustrating details of Step S2 in FIG. 5.

FIG. 7 is a flowchart illustrating details of the process of setting the stored electricity that can be consumed in the own home by the next midnight power rate time slot and the surplus stored electricity that can be interchanged to other home by the next midnight power rate time slot in Step S2 of FIG. 5. When the flow starts, it is checked in Step S52 whether or not the present time has reached 7:00 a.m. when the midnight power rate time slot is finished. The checking of Step S52 is performed only for a short time period corresponding to a few periods of repetition of the flow of FIG. 5 after 7:00 a.m., and after the short time period it is not decided that the present time has reached 7:00 a.m. If it is detected in Step S52 that the present time has reached 7:00 a.m., the process goes to Step S54 in which electric power consumption/storage data of one day is reset, and storage is restarted. Then, the process goes to Step S56. On the other hand, if it is not detected in Step S52 that the present time has reached 7:00 a.m., the process goes directly to Step S56.

In Step S56, it is checked whether or not the present time is in the midnight power rate time slot. If it is not in the midnight power rate time slot, it is checked Step S58 whether or not the storage battery 32 is being discharged. This means to check whether or not the electric power stored in the storage battery 32 is being consumed. If it is not being discharged, the process goes to Step S60 in which it is checked whether or not an instruction to close the C-switch 50 is valid. This means to check whether or not the AC electrical appliances 48 are being driven by directly consuming the electric power from the single-phase three-wire commercial electric power 14. If the result is true, the process goes to Step S62 in which total power consumption data is accumulated, and the process goes to Step S64. In addition, the process goes to Step S62 also when discharge of the storage battery 32 is detected in Step S58.

In this way, when discharge of the storage battery 32 or direct power consumption of the single-phase three-wire commercial electric power 14 occurs, the power consumption data is accumulated in Step S62. Note that if either one causes transition to Step S62, the total power consumption data is accumulated in Step S62. Therefore, if both the discharge of the storage battery 32 and the direct power consumption of the single-phase three-wire commercial electric power 14 occur, power consumption data as a sum of them is accumulated. On the other hand, if it is detected in Step S56 that the present time is in the midnight power rate time slot, or if it is not detected in Step S60 that the instruction to close the C-switch 50 is valid, the process goes directly to Step S64 because it is not necessary to accumulate the power consumption data.

In Step S64, it is checked whether or not the present time has reached 11:00 p.m. when the midnight power rate time slot starts. The checking in Step S64 is also performed only for a short time period corresponding to a few periods of repetition of the flow of FIG. 5 after 11:00 p.m. similarly to Step S52, and after the short time period it is not decided that the present time has reached 11:00 p.m. If it is detected in Step S64 that the present time has reached 11:00 p.m., the process goes to Step S66, in which accumulation of the electric power consumption/storage data of one day is finished. Then, the power consumption data from 7:00 a.m. to 11:00 p.m. as a record of the day is settled. In the next Step S68, stored electricity data that can be consumed by the midnight power rate time slot set at the present time is retrieved. Then, in Step S70, a weighted average of data at the present time retrieved in Step S68 and the latest one day data settled in Step S68 is calculated, and data of the electric power that can be consumed by the midnight power rate time slot is updated. Then, the process goes to Step S72. On the other hand, if it is not detected in Step S64 that the present time has reached 11:00 p.m., the process goes directly to Step S72. In this way, the data of electric power that can be consumed by the midnight power rate time slot as an estimated value is corrected every day based on the record so that a separation from reality does not occur.

In Step S72, high-cost electric power in the storage battery 32 that cannot be interchanged between homes is calculated. The details of the calculation process will be described later. Next, in Step S74, the data of stored electricity that can be consumed by the next midnight power rate time slot is retrieved. This data is the latest data that is updated when Steps S66 to S70 are performed. Then, in Step S76, data of electricity that cannot be interchanged obtained in Step S72 is subtracted from the data retrieved in Step S74. In the next Step S78, a result of subtraction in Step S76 is updated as data of the surplus stored electricity that can be interchanged by the next midnight power rate time slot, and the flow is finished.

Figure 8:
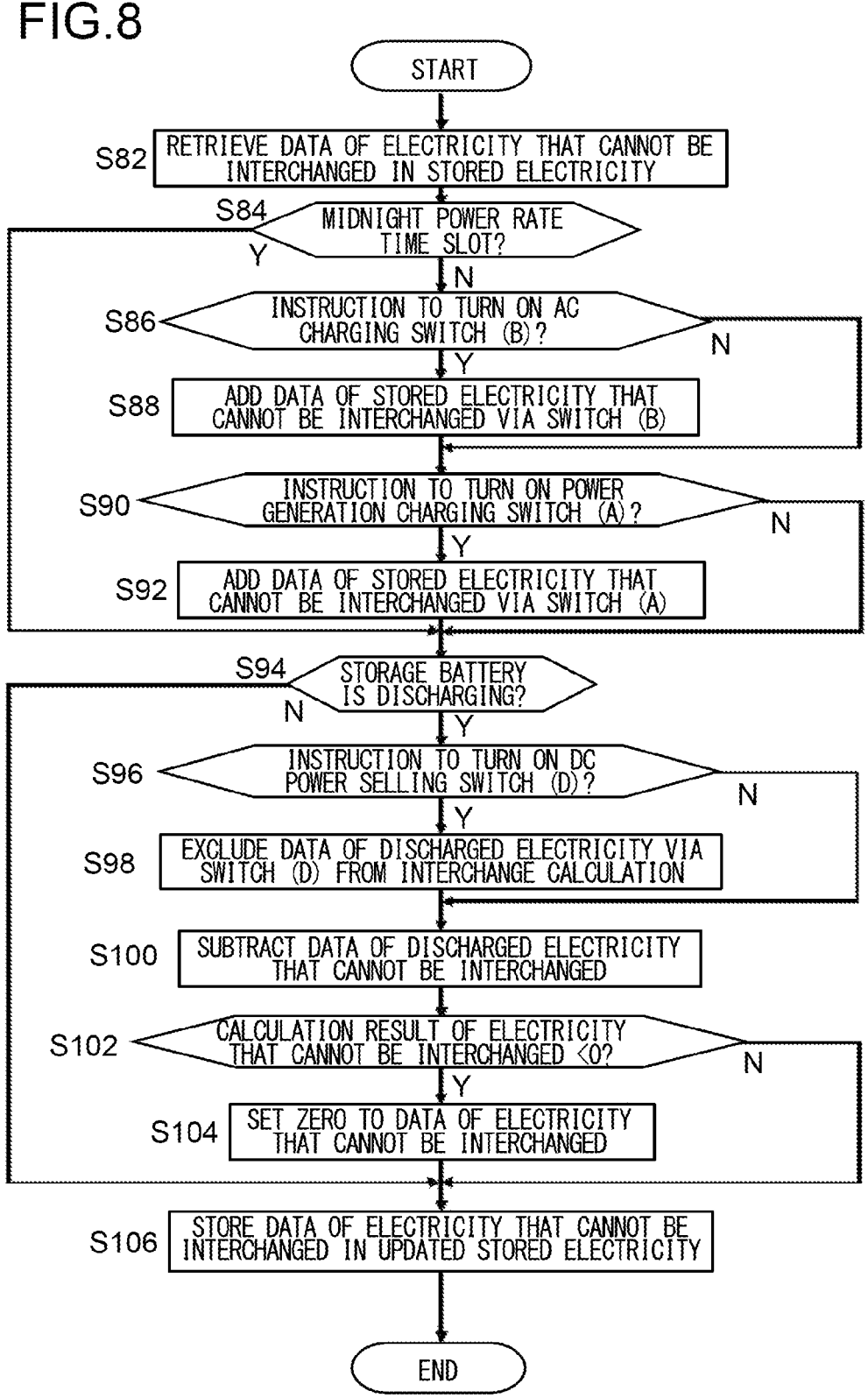
FIG. 8 is a flowchart illustrating details of Step S72 in FIG. 7.

FIG. 8 is a flowchart illustrating details of the calculation process of the electricity that cannot be interchanged in Step S72 of FIG. 7. When the flow starts, the data of electric power that cannot be interchanged in the storage battery 32 at the present time is retrieved in Step S82. Then, in Step S84, it is checked whether or not the present time is in the midnight power rate time slot. If it is not in the midnight power rate time slot, there is possibility that high-cost charging is performed. Therefore, the process goes to Step S86 in which it is checked whether or not an instruction to close the B-switch 36 is valid. If the result is true, the process goes to Step S88 in which the stored electricity in the storage battery 32 from the single-phase three-wire commercial electric power 14 via the B-switch 36 is added to data retrieved in Step S82 as electricity that cannot be interchanged, and the process goes to Step S90. On the other hand, if the instruction to close the B-switch 36 is not valid in Step S86, the process goes directly to Step S90.

In Step S90, it is checked whether or not an instruction to close the A-switch 34 is valid. If the result is true, the process goes to Step S92 in which the stored electricity in the storage battery 32 from the photovoltaic power generation electric power via the A-switch 34 is added to data retrieved in Step S82 as electricity that cannot be interchanged, and the process goes to Step S94. On the other hand, if the instruction to close the A-switch 34 is not valid in Step S90, the process goes directly to Step S94. In addition, if the present time is not in the midnight power rate time slot in Step S84, the process also goes directly to Step S94.

In Step S94, it is checked whether or not the storage battery 32 is being discharged. If the result is true, the process goes to Step S96 in which it is checked whether or not an instruction to close the D-switch 54 is valid. If the result is true, the process goes to Step S98 in which data of discharged electricity for interchanging electric power to other home via the D-switch 54 is excluded from the interchange calculation, and the process goes to Step S100. It is because the interchange to other home is not consumption in the own home. On the other hand, if the instruction to close the D-switch 54 is not valid in Step S96, all the discharge of the storage battery 32 means consumption in the own home. Therefore, the process goes directly to Step S100. In Step S100, the discharged electricity, namely the power consumption in the own home is subtracted from data retrieved as electricity that cannot be interchanged in Step S82. This means that high-cost electric power that cannot be interchanged is consumed in the own home, and as a result the electric power that cannot be interchanged is reduced.

Next in Step S102, it is checked whether or not electricity that cannot be interchanged has become negative as a result of the subtraction in Step S100. If the electricity that cannot be interchanged has become negative, the process goes to Step S104 in which data of the electricity that cannot be interchanged is set to zero, and the process goes to Step S106. It is because the electricity that cannot be interchanged is eliminated, and hence it is not reasonable to take further consumption of electric power into account of the electricity that cannot be interchanged. On the other hand, the electricity that cannot be interchanged has not become negative in Step S102, the process goes directly to Step S106 so as to adopt the electricity that cannot be interchanged as it is, which is the result of the subtraction. Note that if it is not detected that the storage battery 32 is being discharged in Step S94, the electricity that cannot be interchanged is not reduced. Therefore, the process goes directly to Step 106. In Step S106, the above-mentioned result is stored as updated data of the electricity that cannot be interchanged in the storage battery, and the flow is finished.

In the above-mentioned first example, there is described the example where two homes are dwelling in the condominium 2. However, various features of the present invention described above are not limited to applications of a multiple dwelling house such as a condominium, but can be embodied similarly in a residential section where houses are arranged. In this case, the photovoltaic power generation panel for each home is installed on a roof of each house.

As described above, according to the first example, there is provided an electric power system including a first unit equipped with a first power source, a first rechargeable battery to which an output of the first power source is input, and a first power consuming portion to which an output of the first rechargeable battery is input; a second rechargeable battery; and an electric power line for sharing electric power between the first rechargeable battery and the second rechargeable battery. Further, in the case of the first example, the first power source (and a second power source) is the commercial electric power.

Here, the first example is based on a precondition that the selling power price of the photovoltaic power generation electric power is set higher and is based on a concept of not consuming the photovoltaic power generation electric power that can be sold at high price, and consuming electric power bought at low price from the commercial electric power as the midnight power rate electric power, so as to make a profit of the difference between them (there is a profit even if losses in AC/DC conversion is taken into account). Therefore, the first example adopts the concept of using the photovoltaic power generation electric power for selling as much as possible by DC/AC conversion while restricting interchanging the electric power or even consuming the same (interchange of electric power is performed using the midnight power rate electric power).

Second Example

Hereinafter, construction of a DC electric power network (storage battery distributed system) in a second example is described in detail.

Figure 9:
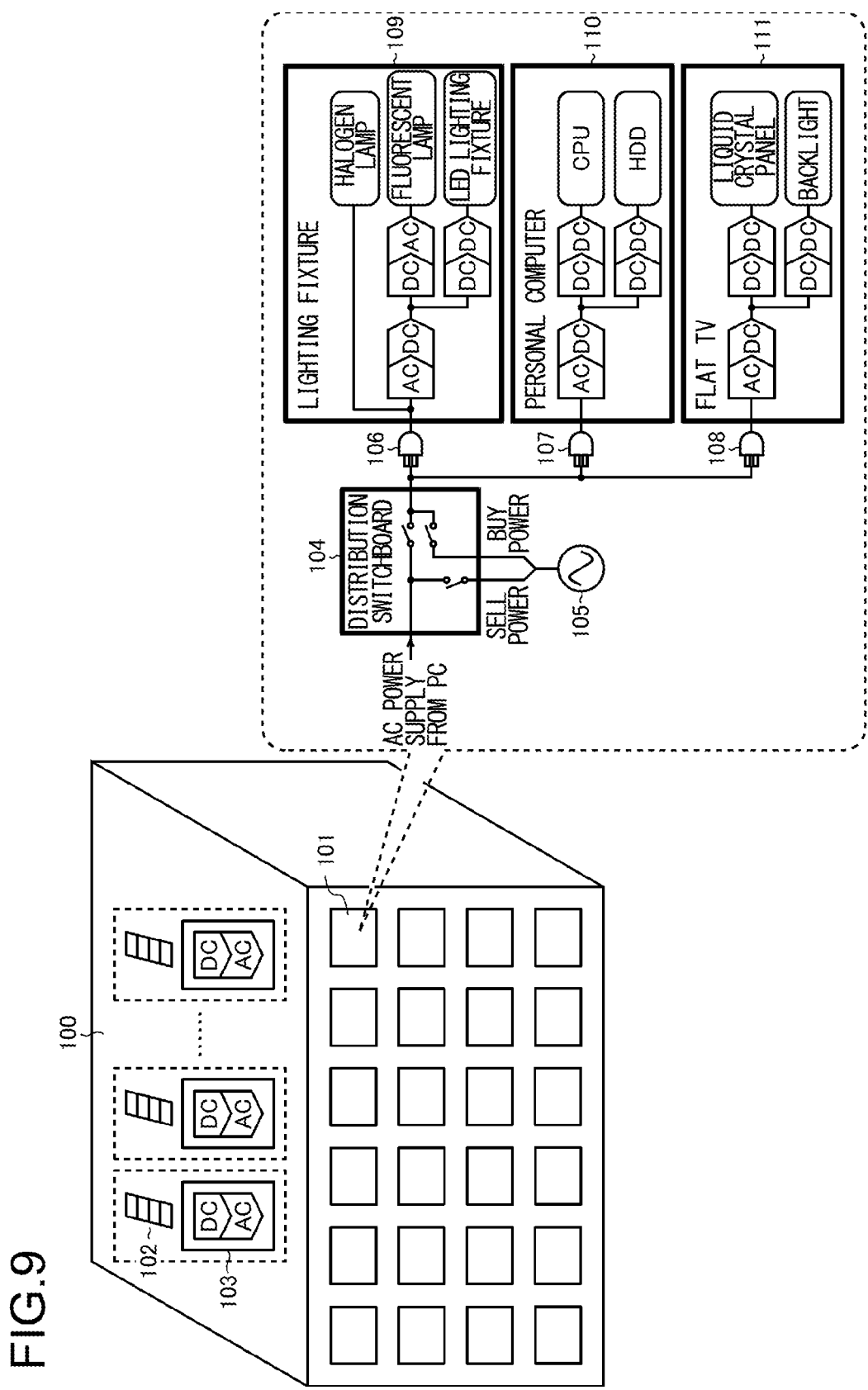
FIG. 9 is a schematic diagram illustrating an electric power supply system of a common multiple dwelling house.

FIG. 9 is a schematic diagram illustrating an electric power supply system of a common multiple dwelling house.

Conventionally, when the photovoltaic power generation system is installed in a the multiple dwelling house 100 such as a condominium, the solar panel 102 and a power conditioner 103 are owned by each person (owned by each resident of a residential room 101).

Therefore, in the second example described below, it is supposed that the solar panel and the power conditioner are owned by each person, and there is proposed a DC electric power network that can make a unique merit of being the multiple dwelling house. However, the above-mentioned "multiple dwelling house" is not limited to a condominium or an apartment, but can be an aggregate of houses, for example.

Figure 10:
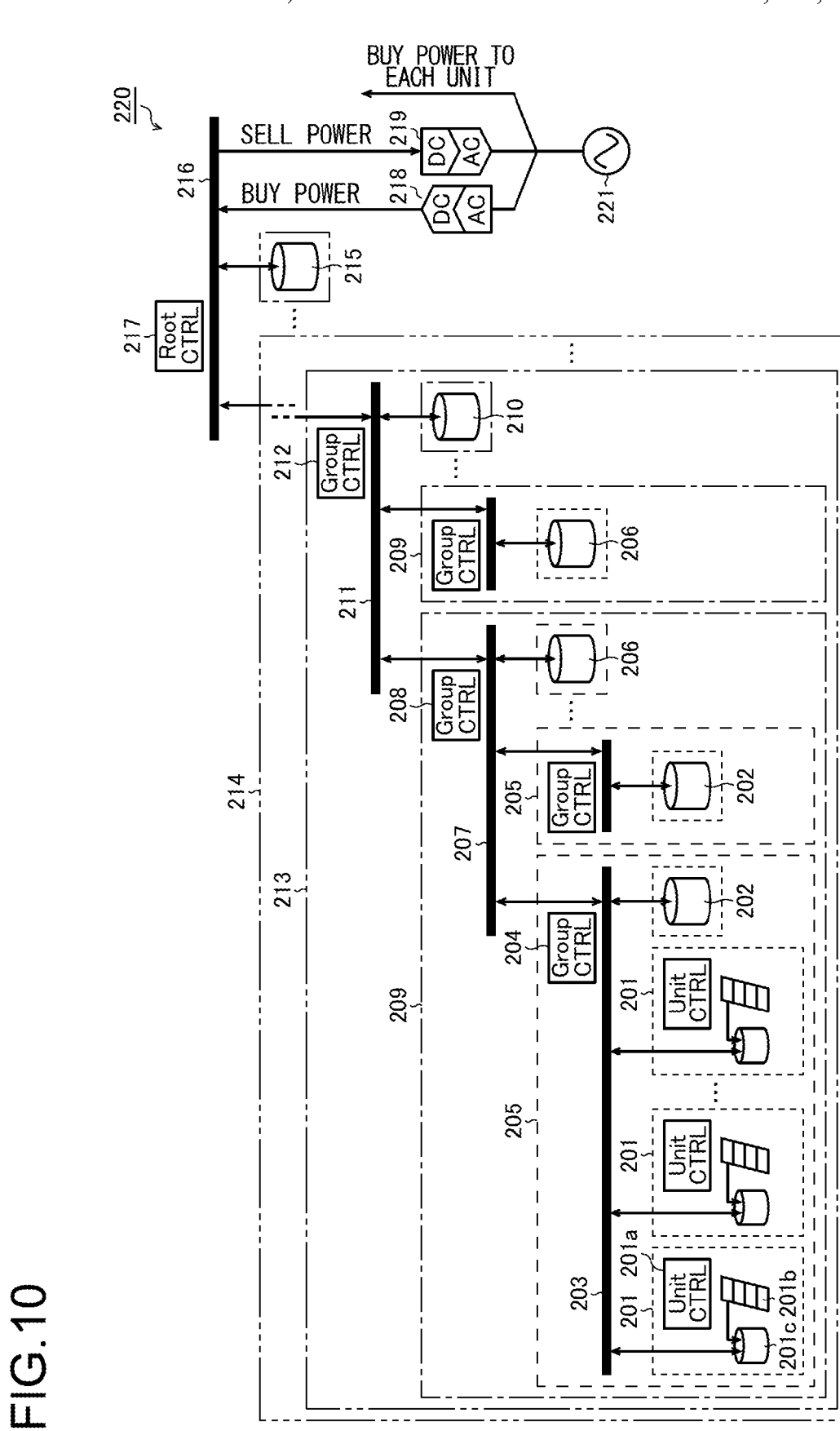
FIG. 10 is a schematic diagram illustrating an embodiment of a DC electric power network (second example).

FIG. 10 is a schematic diagram illustrating an embodiment of a DC electric power network (storage battery distributed system).

A plurality of units 201 included in the DC electric power network in this embodiment correspond to homes of individual persons (for example, residential rooms of a condominium or houses), each of which includes a unit control portion 201a, a solar panel 201b, and a unit storage battery 201c. Note that if a small capacity of storage battery (like a car battery, for example) is used as the unit storage battery 201c, it is easy to increase or decrease the DC electric power networks.

In addition, in the DC electric power network of this embodiment, a first class group 205 is formed to include the plurality of units 201, a shared storage battery 202, a first class shared electric power line 203, and a first class group control portion 204. Note that the plurality of units 201 share the shared storage battery 202 via the shared electric power line 203 under integral control by the group control portion 204.

In addition, in the DC electric power network of this embodiment, a second class group 209 is formed to include the plurality of groups 205, a first class shared storage battery 206, a second class shared electric power line 207, and a second class group control portion 208. Note that the plurality of groups 205 share the shared storage battery 206 via the shared electric power line 207 under integral control by the group control portion 208.

In addition, in the DC electric power network of this embodiment, a third class group 213 is formed to include the plurality of groups 209, a second class shared storage battery 210, a third class shared electric power line 211, and a third class group control portion 212. Note that the plurality of groups 209 share the shared storage battery 210 via the shared electric power line 211 under integral control by the group control portion 212.

In addition, in the DC electric power network of this embodiment, the group formation similar to the above description is repeated, and an N-th class (class number N is arbitrary) group 214 is formed as a highest class group. Then, finally, a route 220 is formed to include the plurality of groups 214, an N-th class shared storage battery 215, a route class shared electric power line 216, a route control portion 217, an AC/DC converter 218, and a DC/AC converter 219. Note that the plurality of groups 214 share the shared storage battery 215 via the shared electric power line 216 under integral control by the route control portion 217.

In addition, in the DC electric power network of this embodiment, buying and selling of AC electric power is performed between the route 220 and an electric power company 221. Therefore, it is basically not allowed to directly perform the buying and selling of AC electric power between the electric power company 221 and the unit 201 or the group 205, 209, 213, ..., or 214. However, even if stored electric power of the entire DC electric power network is absolutely short, electric power supply to electrical appliances owned by the unit 201 must be continued. Therefore, the DC electric power network of this embodiment has a structure in which a path for the unit 201 to directly buy AC electric power from the electric power company 221 is provided.

In this way, the DC electric power network of this embodiment is constructed based on the precondition that the solar panel 201b and the power conditioner (not shown) are owned by person, and hence a large-scale of infrastructure is not necessary.

In addition, the DC electric power network of this embodiment has a structure in which electrical storage capacities are interchanged between a unit and a group (between the unit storage battery 201c and the shared storage battery 202), or between groups (between the shared storage battery 202 and the shared storage battery 206, between the shared storage battery 206 and the shared storage battery 210, and the like), or between a group and the route (between a shared storage battery (not shown) belonging to the N-th class group 214 and the shared storage battery 215), so that electrical storage capacity of the entire DC electric power network is regarded as large. In addition, the DC electric power network of this embodiment has a structure in which in order to avoid a state where any one of the storage batteries is fully charged as much as possible, the above-mentioned interchange of the electrical storage capacity between a unit and a group, or between groups, or between a group and the route (charge/discharge between storage batteries) is performed frequently. With this structure, the DC electric power obtained from the solar panel 201b of the unit 201 can be used as the DC electric power as much as possible, and hence it is possible to reduce electric power losses due to the DC/AC conversion and the AC/DC conversion.

FIG. 11 is a schematic diagram illustrating a structural example of the unit. A unit 300 of this structural example includes a unit control portion 301, a unit storage battery 302, an electric power monitoring portion 303, a charge control portion 304, an AC/DC converter 305, a DC/AC converter 306, an AC plug 307, DC plugs 308 to 310, a lighting fixture 311, a personal computer 312, a flat television set 313, switches a1 and a2 for buying/charging electricity, and switches b1 to b5 for selling/discharging/consuming electricity. In addition, the group to which the unit 300 belongs includes a group control portion 314, a shared storage battery 315, and a shared electric power line 316. In addition, on a path for the unit 300 to directly buy AC electric power from the electric power company 317, there is disposed an electric power monitoring portion 318. Note that FIG. 11 is a diagram in which components of the unit 300 are noted, and components outside the unit (components of the group to which the unit 300 belongs) are illustrated only partially.

The unit control portion 301 performs on/off control of the switches a1 and a2 (buying/charging electricity control) and on/off control of the switches b1 to b5 (selling/discharging/consuming electricity control). Note that when charge/discharge of the DC electric power is performed between the unit storage battery 302 and the shared storage battery 315, the unit control portion 301 outputs a request to buy electricity or a request to sell electricity to the group control portion 314, and checks an instruction to buy electricity or an instruction to sell electricity replied from the group control portion 314.

As described above, the unit storage battery 302 is a small capacity storage battery (like a car battery, for example). Note that the unit storage battery 302 is charged by "DC power supplying from the power conditioner (not shown)" and "DC power buying from the shared storage battery 315". In addition, the unit storage battery 302 is discharged by "electric power consumption in the unit 300" and "DC power selling to the shared storage battery 315".

The electric power monitoring portion 303 compares the generated electric power of DC power supplying from the solar panel (not shown) via the power conditioner (not shown) with the power consumption in the unit 300 (discharging electric power of the unit storage battery 302), so as to perform electric power monitoring of the unit storage battery 302. Specifically, if the generated electric power is larger than the power consumption, it is decided that the unit storage battery 302 is in a power surplus state (in which an electric power balance of the unit storage battery 302 is positive (surplus)). On the contrary, if the generated electric power is smaller than the power consumption, it is decided that the unit storage battery 302 is in a power shortage state (in which the electric power balance of the unit storage battery 302 is negative (short)).

The charge control portion 304 converts the DC electric power supplied from the power conditioner (not shown) or the shared electric power line 316 into a level suitable for charging the unit storage battery 302. Note that the power conditioner (not shown) owned by the unit 300 needs not to perform the interconnection with the commercial AC electric power from the electric power company 317. Therefore, it is possible to adopt a structure in which the DC electric power obtained by the solar panel (not shown) is not converted into AC electric power but is directly supplied to the charge control portion 304. With this structure, when charging from the power conditioner (not shown) to the unit storage battery 302, there occurs no electric power loss due to the DC/AC conversion process or the AC/DC conversion process.

The AC/DC converter 305 converts the AC electric power supplied from the electric power company 317 into the DC electric power, and supplies the DC electric power to the DC plugs 308 to 310.

The DC/AC converter 306 converts the DC electric power discharged from the unit storage battery 302 into the AC electric power, and supplies the AC electric power to the AC plug 307.

The AC plug 307 is a plug for drawing out the AC electric power into the residential room.

The DC plugs 308 to 310 are plugs for drawing out the DC electric power into the residential room.

As the lighting fixture 311, there can be used a halogen lamp (AC load), a fluorescent lamp (AC load), an LED lighting fixture (DC load), and the like. Note that FIG. 11 illustrates a power supplying path for the AC electric power drawn out from the AC plug 307 to be supplied directly to the halogen lamp. In addition, FIG. 11 illustrates a power supplying path for the DC electric power from the DC plug 308 to be supplied to the fluorescent lamp via the DC/AC converter and a power supplying path for the same to be supplied to the LED lighting fixture via the DC/DC converter. In this way, the halogen lamp and the fluorescent lamp as AC loads can be supplied with the AC electric power bought from the electric power company 317 or with the AC electric power generated by DC/AC conversion of the DC electric power discharged from the unit storage battery 302. In addition, the LED lighting fixture as a DC load can be supplied with the DC electric power discharged from the unit storage battery 302 or the DC electric power generated by AC/DC conversion of the AC electric power bought from the electric power company 317.

The personal computer 312 includes a CPU and an HDD (which are DC loads). Note that FIG. 11 illustrates a power supplying path for the DC electric power from the DC plug 309 to be led into the personal computer 312 and to be supplied to the CPU and the HDD via a DC/DC converter. With this structure, it is not necessary to dispose an AC/DC converter in the personal computer 312, so that the device can be downsized, and cost thereof can be reduced. In addition, an electric power loss due to the AC/DC conversion process can be eliminated.

The flat television set 313 includes a liquid crystal panel and a backlight (which are DC loads). Note that FIG. 11 illustrates a power supplying path for the DC electric power from the DC plug 310 to be led into the flat television set 313 and to be supplied to the liquid crystal panel and the backlight via a DC/DC converter. With this structure, it is not necessary to dispose an AC/DC converter in the flat television set 313, so that the device can be downsized, and cost thereof can be reduced. In addition, an electric power loss due to the AC/DC conversion process can be eliminated.

The switch a1 is controlled to be turned on and off by the unit control portion 301 so as to make and break a connection between the AC/DC converter 305 and the DC plugs 308 to 310. The switch a2 is controlled to be turned on and off by the unit control portion 301 so as to make and break a connection of the charging path from the shared electric power line 316 to the unit storage battery 302 (DC power buying path).

The switch b1 is controlled to be turned on and off by the unit control portion 301 so as to make and break a connection of the AC power supplying path from the electric power company 317 to the AC plug 307. The switch b2 is controlled to be turned on and off by the unit control portion 301 so as to make and break a connection between the DC/AC converter 306 and the AC plug 307. The switch b3 is controlled to be turned on and off by the unit control portion 301 so as to make and break a connection between the AC/DC converter 305 and the DC plugs 308 to 310. The switch b4 is controlled to be turned on and off by the unit control portion 301 so as to make and break a connection between the unit storage battery 302 and the DC plugs 308 to 310. The switch b5 is controlled to be turned on and off by the unit control portion 301 so as to make and break a connection of the discharging path from the unit storage battery 302 to the shared electric power line 316 (DC power selling path).

When the group control portion 314 performs charge/discharge of the DC electric power between the unit storage battery 302 and the shared storage battery 315, it receives the request to buy electricity or the request to sell electricity from the group control portion 314, and outputs the instruction to buy electricity or the instruction to sell electricity as a reply to the unit control portion 301.

The shared storage battery 315 is connected to the shared electric power line 316 and performs charge/discharge of the DC electric power with the unit storage battery 302.

The shared electric power line 316 is a path for performing charge/discharge of the DC electric power between the unit storage battery 302 and the shared storage battery 315.

The electric power company 317 supplies the AC electric power to the unit 300.

The electric power monitoring portion 318 is an electric power meter that accumulates AC electric power amount supplied from the electric power company 317 to the unit 300 for a predetermined period (for example, one month), so as to obtain billing information to the unit 300.

FIG. 12 is an operation list of the unit control portion 301, which shows, in order from the left, numbers assigned to operation states, a result of monitoring electric power by the electric power monitoring portion 303, presence or absence of the request to buy electricity or the request to sell electricity output from the unit control portion 301, content of the instruction to buy electricity or the instruction to sell electricity of the group control portion 314, on/off states of the switches a1 and a2 for buying/charging electricity, on/off states of the switches b1 to b5 for selling/discharging/consuming electricity, and features (merits and demerits) of the operation states.

A first operation state is a state in which the electric power balance of the unit storage battery 302 is positive (surplus), and the shared storage battery 315 can accept the surplus electric power of the unit 300. As a supposed situation, there is a case where power consumption of the unit 300 is small during daytime (fine weather) and the shared storage battery 315 has vacant capacity, or a case where the power consumption of the unit 300 is zero, and the shared storage battery 315 has vacant capacity.

In the first operation state, the electric power monitoring portion 303 decides that the unit storage battery 302 is in the power surplus state. When the unit control portion 301 receives this decision result, it outputs to the group control portion 314 the request to sell electricity (request for DC power selling of the surplus electric power of the unit 300 to the group side). When the group control portion 314 receives this request to sell electricity, it outputs the instruction to sell electricity to the unit control portion 301 so as to allow (validate) the DC power selling of the unit 300 (which is shown by "○" in the diagram).

Note that in the first operation state, the unit control portion 301 does not output to the group control portion 314 the request to buy electricity (request for compensating for short electric power of the unit 300 by the DC power buying from the group side). Therefore, the group control portion 314 outputs to the unit control portion 301 the instruction to buy electricity that means not to allow (invalidate) the DC power buying of the unit 300 (which is shown by "x" in the diagram).

In this first operation state, the unit control portion 301 turns off the switches a1 and a2 as well as the switches b1 and b3, and turns on the switches b2, b4, and b5. With this switch control, electric power supply from the unit storage battery 302 to unit loads 311 to 313 is performed, and DC power selling from the unit storage battery 302 to the shared storage battery 315 is performed.

Therefore, in the first operation state, only the DC electric power obtained by the photovoltaic power generation is sufficient for all the power consumption of the unit 300. In addition, the surplus electric power of the unit 300 can be sold to the group side by the DC power selling so as to earn the income of the value.

A second operation state is a state in which the electric power balance of the unit storage battery 302 is positive (surplus), but the shared storage battery 315 cannot accept the surplus electric power of the unit 300. As a supposed situation, there is a case where power consumption of the unit 300 is small during daytime (fine weather) and the shared storage battery 315 is fully charged, or a case where power consumption of the unit 300 is zero, and the shared storage battery 315 is fully charged.

In the second operation state, the request to sell electricity is output from the unit control portion 301 to the group control portion 314 similarly to the first operation state described above. However, in the second operation state, the shared storage battery 315 cannot accept the surplus electric power of the unit 300. Therefore, when the group control portion 314 receives the above-mentioned request to sell electricity, it outputs to the unit control portion 301 the instruction to sell electricity that means not to allow (invalidate) the DC power selling of the unit 300 (which is shown by "x" in the diagram). Note that similarly to the above-mentioned first operation state, the unit control portion 301 does not output the request to buy electricity to the group control portion 314 in the second operation state, too. Therefore, the group control portion 314 outputs to the unit control portion 301 the instruction to buy electricity that means not to allow (invalidate) the DC power buying of the unit 300 (which is shown by "x" in the diagram).

In this second operation state, the unit control portion 301 turns off the switches a1 and a2 as well as switches b1, b3, and b5, and turns on the switches b2 and b4. In other words, in the second operation state, unlike the above-mentioned first operation state, the switch b5 is turned off. With this switch control, the electric power supply from the unit storage battery 302 to the unit loads 311 to 313 is performed, but the DC power selling from the unit storage battery 302 to the shared storage battery 315 is stopped.

Therefore, in the second operation state, the surplus electric power of the unit 300 cannot be sold to the group side by the DC power selling, but the DC electric power obtained by the photovoltaic power generation is sufficient for all the power consumption in the unit 300.

A third operation state is a state in which the electric power balance of the unit storage battery 302 is negative (short), but the short electric power of the unit 300 can be compensated from the shared storage battery 315. As a supposed situation, there is a case where it is during daytime (cloudy or rainy) or during night, and the shared storage battery 315 has surplus electric power, or a case where power consumption of the unit 300 is large, and the shared storage battery 315 has surplus electric power.

In the third operation state, the electric power monitoring portion 303 decides that the unit storage battery 302 is in the power shortage state. When the unit control portion 301 receives this decision result, it outputs the request to buy electricity to the group control portion 314. When the group control portion 314 receives this request to buy electricity, it outputs to the unit control portion 301 the instruction to buy electricity that means to allow (validate) the DC power buying of the unit 300 (which is shown by "○" in the diagram).

Note that in the third operation state, the unit control portion 301 does not output to the group control portion 314 the request to sell electricity. Therefore, the group control portion 314 outputs to the unit control portion 301 the instruction to sell electricity that means not to allow (invalidate) the DC power selling of the unit 300 (which is shown by "x" in the diagram).

In this third operation state, the unit control portion 301 turns off the switch a1 as well as the switches b1, b3, and b5, and turns on the switch a2 as well as the switches b2 and b4. With this switch control, electric power supply from the unit storage battery 302 to the unit loads 311 to 313 is performed, and DC power buying from the shared storage battery 315 to the unit storage battery 302 is performed.

Therefore, in the third operation state, the short electric power of the unit storage battery 302 can be compensated not by the AC power buying from the electric power company 317 but by the DC power buying from the shared storage battery 315 at lower cost. Therefore, the shared DC electric power in the group can be effectively used. However, unlike the above-mentioned first and second operation states, it should be noted that there is an expense for the DC power buying from the shared storage battery 315 in the third operation state.

A fourth operation state is a state in which the electric power balance of the unit storage battery 302 is negative (short), and the short electric power of the unit 300 cannot be compensated from the shared storage battery 315. As a supposed situation, there is a case where it is during daytime (cloudy or rainy) or during night, and the shared storage battery 315 has no surplus electric power, or a case where the power consumption of the unit 300 is large, and the shared storage battery 315 has no surplus electric power.

In the fourth operation state, the request to sell electricity is output from the unit control portion 301 to the group control portion 314 similarly to the above-mentioned third operation state. However, in the fourth operation state, the short electric power of the unit 300 cannot be compensated from the shared storage battery 315. Therefore, when receiving the request to buy electricity, the group control portion 314 outputs to the unit control portion 301 the instruction to buy electricity that means not to allow (invalidate) the DC power buying of the unit 300 (which is shown by "x" in the diagram). Note that similarly to the above-mentioned third operation state, the unit control portion 301 does not output the request to buy electricity to the group control portion 314 in the fourth operation state, too. Therefore, the group control portion 314 outputs to the unit control portion 301 the instruction to sell electricity that means not to allow (invalidate) the DC power selling of the unit 300 (which is shown by "x" in the diagram).

In this fourth operation state, the unit control portion 301 turns off the switch a2 as well as switches b2, b4, and b5, switch a1, and turns on the switches b1 and b3. With this switch control, the electric power supply to the unit loads 311 to 313 is performed by the AC power buying from the electric power company 317.

Therefore, in the fourth operation state, even if both the unit storage battery 302 and the shared storage battery 315 become the power shortage state, a minimum electric power necessary for operating the unit loads 311 to 313 can be secured by performing the AC power buying from the electric power company 317. However, in the fourth operation state, it should be noted that there is an expense for AC power buying from the electric power company 317, and there is an electric power loss due to the AC/DC conversion process.

Figure 13:
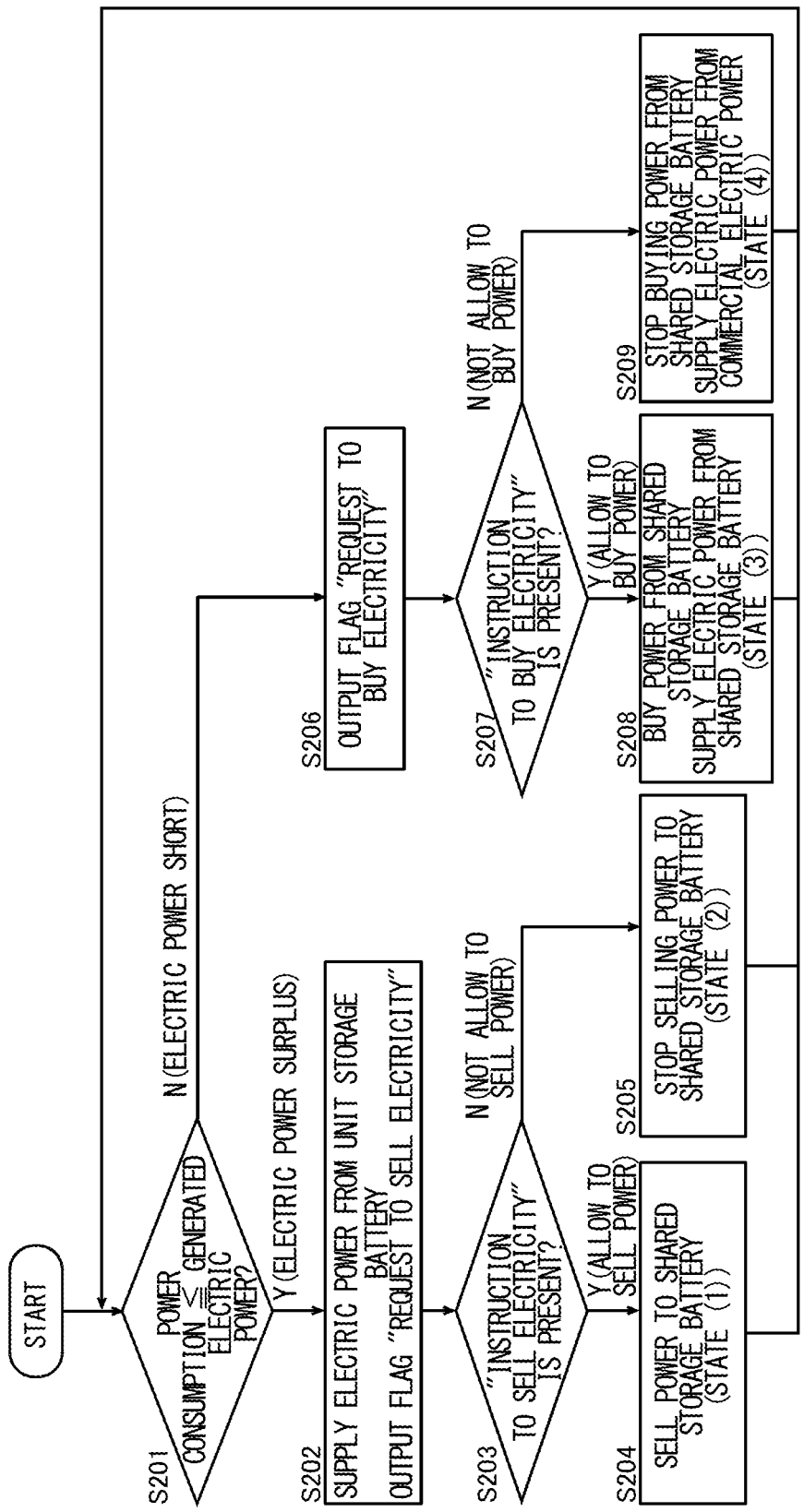
FIG. 13 is an operation flowchart of the unit control portion.

FIG. 13 is an operation flowchart of the unit control portion 301.

In Step S201, it is checked whether or not the power consumption of the unit 300 is equal or smaller than the generated electric power. Here, if it is decided that the power consumption is equal or smaller than the generated electric power, the flow goes to Step S202 regarding that the unit storage battery 302 is in the power surplus state. On the other hand, if it is decided that the power consumption is not equal or smaller than the generated electric power, the flow goes to Step S206 regarding that the unit storage battery 302 is in the power shortage state.

If it is decided in Step S201 that the power consumption is equal or smaller than the generated electric power, the switches a1 and a2 as well as the switches b1 to b5 are appropriately controlled to be turned on and off in Step S202 so that the electric power supply to the unit loads 311 to 313 is performed from the unit storage battery 302. In addition, a flag of the request to sell electricity that means to sell the surplus electric power of the unit 300 to the group side by the DC power selling is output to the group control portion 314.

After that, in Step S203, the instruction to sell electricity replied from the group control portion 314 is checked. Here, if the instruction to sell electricity that means to allow the DC power selling of the unit 300 is confirmed, the flow goes to Step S204. On the other hand, if the instruction to sell electricity that means not to allow the DC power selling of the unit 300 is confirmed, the flow goes to Step S205.

If the instruction to sell electricity that means to allow the DC power selling of the unit 300 is confirmed in Step S203, the switch b5 is turned on in Step S204 so as to perform the DC power selling to the shared storage battery 315. This state corresponds to the above-mentioned first operation state. After that, the flow goes back to Step S201.

On the other hand, if the instruction to sell electricity that means not to allow the DC power selling of the unit 300 is confirmed in Step S203, the switch b5 is turned off in Step S205 so as to stop the DC power selling to the shared storage battery 315. This state corresponds to the above-mentioned second operation state. After that, the flow goes back to Step S201.

In addition, if it is decided in Step S201 that the power consumption is not equal or smaller than the generated electric power, a flag of the request to buy electricity that means to compensate for the short electric power of the unit 300 by the DC power buying from the group side is output to the group control portion 314 in Step S206.

After that, in Step S207, the instruction to buy electricity replied from the group control portion 314 is checked. Here, if the instruction to buy electricity that means to allow the DC power buying of the unit 300 is confirmed, the flow goes to Step S208. On the other hand, if the instruction to buy electricity that means not to allow the DC power buying of the unit 300 is confirmed, the flow goes to Step S209.

In Step S207, if the instruction to buy electricity that means to allow the DC power buying of the unit 300 is confirmed, the switch a2 is turned on so as to perform the DC power buying from the shared storage battery 315 in Step S208. This state corresponds to the above-mentioned third operation state. Note that the electric power supply to the unit loads 311 to 313 is performed from the shared storage battery 315 via the unit storage battery 302 in the third operation state. After that, the flow goes back to Step S201.

On the other hand, in Step S207, if the instruction to buy electricity that means not to allow the DC power buying of the unit 300 is confirmed, the switches a1 and b3 are turned on so as to perform the AC power buying from the electric power company 317 in Step S209. This state corresponds to the above-mentioned fourth operation state. Note that the electric power supply to the unit loads 311 to 313 is performed from the electric power company 317 in the fourth operation state. After that, the flow goes back to Step S201.

Figure 14:
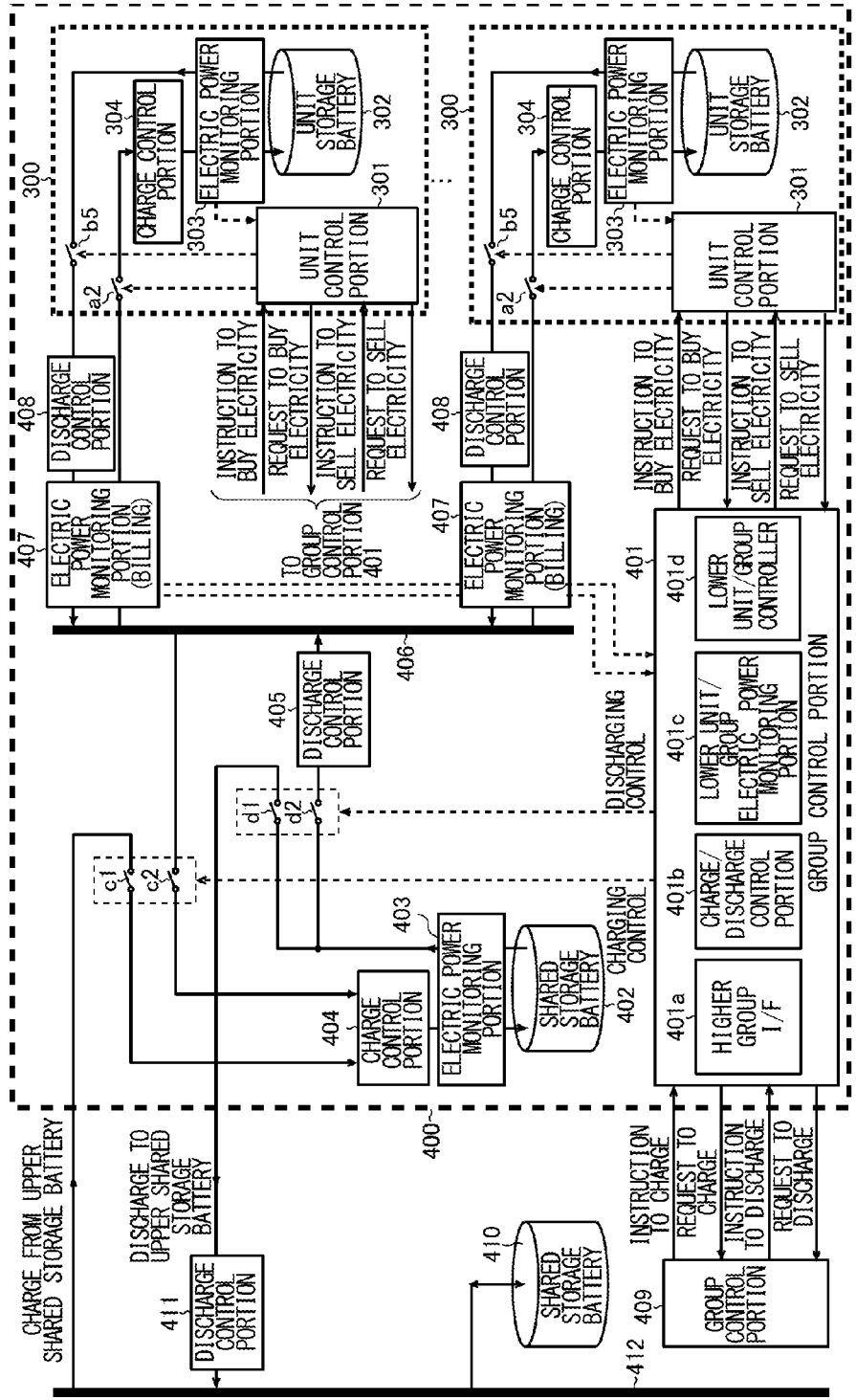
FIG. 14 is a schematic diagram illustrating a structural example of a group.

FIG. 14 is a schematic diagram illustrating a structural example of a group. A group 400 of this structural example is a lowest class (first class) group to which the plurality of units 300 belong. The group 400 includes a group control portion 401, a shared storage battery 402, an electric power monitoring portion 403, a charge control portion 404, a discharge control portion 405, a shared electric power line 406, an electric power monitoring portion 407, a discharge control portion 408, switches c1 and c2 for charging, and switches d1 and d2 for discharging. In addition, the upper class (second class) group to which the group 400 belongs includes a group control portion 409, a shared storage battery 410, a discharge control portion 411, and a shared electric power line 412. Note that FIG. 14 is a diagram in which components of the group 400 are noted, and components outside the group (the unit 300 and components of the higher group) are illustrated only partially. In addition, in FIG. 14, the lowest class group is exemplified for description, but the upper class group has the same basic structure.

When the group control portion 401 performs charge/discharge of the DC electric power between the shared storage battery 402 of its own group and the shared storage battery 410 of the higher group, it outputs a request to charge or a request to discharge to the upper class group control portion 409, and checks an instruction to charge or an instruction to discharge replied from the group control portion 409.

In addition, when the group control portion 401 performs charge/discharge of the DC electric power between the shared storage battery 402 of its own group and the unit storage battery 302 of the unit 300, it receives the request to buy electricity or the request to sell electricity from the unit control portion 301, and outputs the instruction to buy electricity or the instruction to sell electricity as reply to the unit control portion 301.

Note that the group control portion 401 includes a higher group interface portion 401*a*, a charge/discharge control portion 401*b*, a lower unit/group electric power monitoring portion 401*c*, and a lower unit/group controller 401*d*. The higher group interface portion 401*a* performs intercommunication with the upper class group control portion 409. The charge/discharge control portion 401*b* performs on/off control of the switches c1 and c2 and on/off control of the switches d1 and d2. The lower unit/group electric power monitoring portion 401*c* integrally manages billing information of each of the plurality of units 300 (balance of buying and selling the DC electric power). The lower unit/group controller 401*d* performs intercommunication with the unit control portion 301.

The shared storage battery 402 is connected to the shared electric power lines 406 and 412, so as to perform charge/discharge of the DC electric power with the unit storage battery 302 or with the shared storage battery 410 of the higher group. In other words, the shared storage battery 402 of the group 400 is charged by "DC power charging from the unit storage battery 302 (or the shared storage battery of the lower group)" and "DC power charging from the shared storage battery 410 of the higher group". In addition, the shared storage battery 402 of the group 400 is discharged by "DC power discharging to the unit storage battery 302 (or the shared storage battery of the lower group)" and "DC power discharging to the shared storage battery 410 of the higher group".

The electric power monitoring portion 403 compares charging electric power with the discharging electric power of the shared storage battery 402 so as to perform the electric power monitoring of the shared storage battery 402. Specifically, if the charging electric power is larger than the discharging electric power, it is decided that the shared storage battery 402 is in the power surplus state (in which the electric power balance of the shared storage battery 402 is positive (surplus)). On the contrary, if the charging electric power is smaller than the discharging electric power, it is decided that the shared storage battery 402 is in the power shortage state (in which the electric power balance of the shared storage battery 402 is negative (short)). In addition, the electric power monitoring portion 403 also performs full charge decision of the shared storage battery 402.

The charge control portion 404 converts a DC electric power supplied from the shared electric power line 406 or 412 into a level suitable for charging the shared storage battery 402.

The discharge control portion 405 converts a DC electric power discharged from the shared storage battery 402 into a level suitable for supplying to the shared electric power line 406.

The shared electric power line 406 is a path for charging and discharging the DC electric power between the unit storage battery 302 and the shared storage battery 402.

The electric power monitoring portion 407 is an electric power meter that accumulates DC electric power amount traded between the unit 300 and the shared electric power line 406 for a predetermined period (for example, one month), so as to obtain billing information (trade balance of the DC electric power) with respect to the unit 300.

The discharge control portion 408 converts the DC electric power discharged from the unit storage battery 302 into a level suitable for supplying to the shared electric power line 406.

The switch c1 is controlled to be turned on and off by the group control portion 401 so as to make and break a connection of the charging path from the shared electric power line 412 to the shared storage battery 402. The switch c2 is controlled to be turned on and off by the group control portion 401 so as to make and break a connection of the charging path from the shared electric power line 406 to the shared storage battery 402.

The switch d1 is controlled to be turned on and off by the group control portion 401 so as to make and break a connection of the discharging path from the shared storage battery 402 to the shared electric power line 412. The switch d2 is controlled to be turned on and off by the group control portion 401 so as to make and break a connection of the discharging path from the shared storage battery 402 to the shared electric power line 406.

When the group control portion 409 performs charge/discharge of the DC electric power between the shared storage battery 402 and the shared storage battery 410, it receives the request to charge or the request to discharge from the group control portion 401, and outputs the instruction to charge or the instruction to discharge as reply to the group control portion 401.

The shared storage battery 410 is connected to the shared electric power line 412 and performs charge/discharge of the DC electric power with the shared storage battery 402.

The discharge control portion 411 converts the DC electric power discharged from the shared storage battery 402 into a level suitable for supplying the shared electric power line 412.

The shared electric power line 412 is a path for charging and discharging the DC electric power between the shared storage battery 402 and the shared storage battery 410.

FIG. 15 is an operation list of the group control portion 401 with respect to the higher group, which shows, in order from the left, numbers assigned to operation states, a result of monitoring electric power by the electric power monitoring portion 403, presence or absence of the request to charge or the request to discharge output from the group control portion 401, a content of the instruction to charge or the instruction to discharge output from the group control portion 409, on/off states of the switches c1 and c2 for charging, and on/off states of the switches d1 and d2 for discharging.

The first operation state is a state in which the electric power balance of the shared storage battery 402 of its own group is positive (surplus), and the shared storage battery 410 of the higher group can accept the surplus electric power of its own group 400.

In the first operation state, the electric power monitoring portion 403 decides that the shared storage battery 402 is in the power surplus state. When receiving this decision result, the group control portion 401 outputs to the upper group control portion 409 the request to discharge (request for the DC power discharging of the surplus electric power of the group 400 to the higher group side). When receiving this request to discharge, the upper group control portion 409 outputs to the group control portion 401 the instruction to discharge that means to allow (validate) the DC power discharging of the group 400 (which is shown by "○" in the diagram).

Note that in the first operation state, the group control portion 401 does not output to the upper group control portion 409 the request to charge (request for compensating for short electric power of the group 400 by the DC power charging from the higher group side). Therefore, the upper group control portion 409 outputs to the group control portion 401 the instruction to charge that means not to allow (invalidate) the DC power charging of the group 400 (which is shown by "x" in the diagram).

In this first operation state, the group control portion 401 turns off the switch c1 and turns on the switch d1. With this switch control, the DC power discharging from the shared storage battery 402 of its own group to the shared storage battery 410 of the higher group is performed.

The second operation state is a state in which the electric power balance of the shared storage battery 402 of its own group is positive (surplus), and the shared storage battery 410 of the higher group cannot accept the surplus electric power of its own group 400.

In the second operation state, the request to discharge is output from the group control portion 401 to the upper group control portion 409 similarly to the above-mentioned first operation state. However, in the second operation state, the shared storage battery 410 of the higher group cannot accept the surplus electric power of its own group 400. Therefore, when receiving the above-mentioned request to discharge, the upper group control portion 409 outputs to the group control portion 401 the instruction to discharge meaning not to allow (invalidate) the DC power discharging of its own group 400 (which is shown by "x" in the diagram). Note that similarly to the above-mentioned first operation state, in the second operation state too, the group control portion 401 never outputs the request to charge to the upper group control portion 409. Therefore, the upper group control portion 409 outputs to the group control portion 401 the instruction to charge that means not to allow (invalidate) the DC power charging of the group 400 (which is shown by "x" in the diagram).

In this second operation state, the group control portion 401 turns off the switches c1 and d1. In other words, in the second operation state, unlike the above-mentioned first operation state, the switch d1 is turned off. With this switch control, the DC power discharging from the shared storage battery 402 of its own group to the shared storage battery 410 of the higher group is stopped.

The third operation state is a state in which the electric power balance of the shared storage battery 402 of its own group is negative (short), the short electric power of its own group 400 can be compensated from the shared storage battery 410 of the higher group.

In the third operation state, the electric power monitoring portion 403 decides that the shared storage battery 402 is in the power shortage state. Receiving this decision result, the group control portion 401 outputs to the upper group control portion 409 the request to charge. Receiving this request to charge, the upper group control portion 409 outputs to the group control portion 401 the instruction to charge that means to allow (validate) the DC power charging of the group 400 (which is shown by "○" in the diagram).

Note that in the third operation state, the group control portion 401 never outputs to the upper group control portion 409 the request to discharge. Therefore, the upper group control portion 409 outputs to the group control portion 401 the instruction to discharge that means not to allow (invalidate) the DC power discharging of the group 400 (which is shown by "x" in the diagram).

In this third operation state, the group control portion 401 turns on the switch c1 and turns off the switch d1. With this switch control, the DC power charging from the shared storage battery 410 of the higher group to the shared storage battery 402 of its own group 400 is performed.

The fourth operation state is a state in which the electric power balance of the shared storage battery 402 of its own group is negative (short), and the shared storage battery 410 of the higher group cannot compensate for the short electric power of its own group 400.

In the fourth operation state, the group control portion 401 outputs to the upper group control portion 409 the request to charge, similarly to the above-mentioned third operation state. However, in the fourth operation state, the shared storage battery 410 of the higher group cannot compensate for the short electric power of its own group 400. Therefore, when receiving the above-mentioned request to charge, the upper group control portion 409 outputs to the group control portion 401 the instruction to charge that means not to allow (invalidate) the DC power charging of the group 400 (which is shown by "x" in the diagram). Note that similarly to the above-mentioned third operation state, in the fourth operation state too, the group control portion 401 never outputs to the upper group control portion 409 the request to discharge. Therefore, the upper group control portion 409 outputs to the group control portion 401 the instruction to discharge that means not to allow (invalidate) the DC power discharging of the group 400 (which is shown by "x" in the diagram).

In this fourth operation state, the group control portion 401 turns off the switches c1 and c2. In other words, in the fourth operation state, unlike the above-mentioned third operation state, the switch c1 is turned off. With this switch control, the DC power charging from the shared storage battery 410 of the higher group to the shared storage battery 402 of its own group is stopped.

Figure 16:
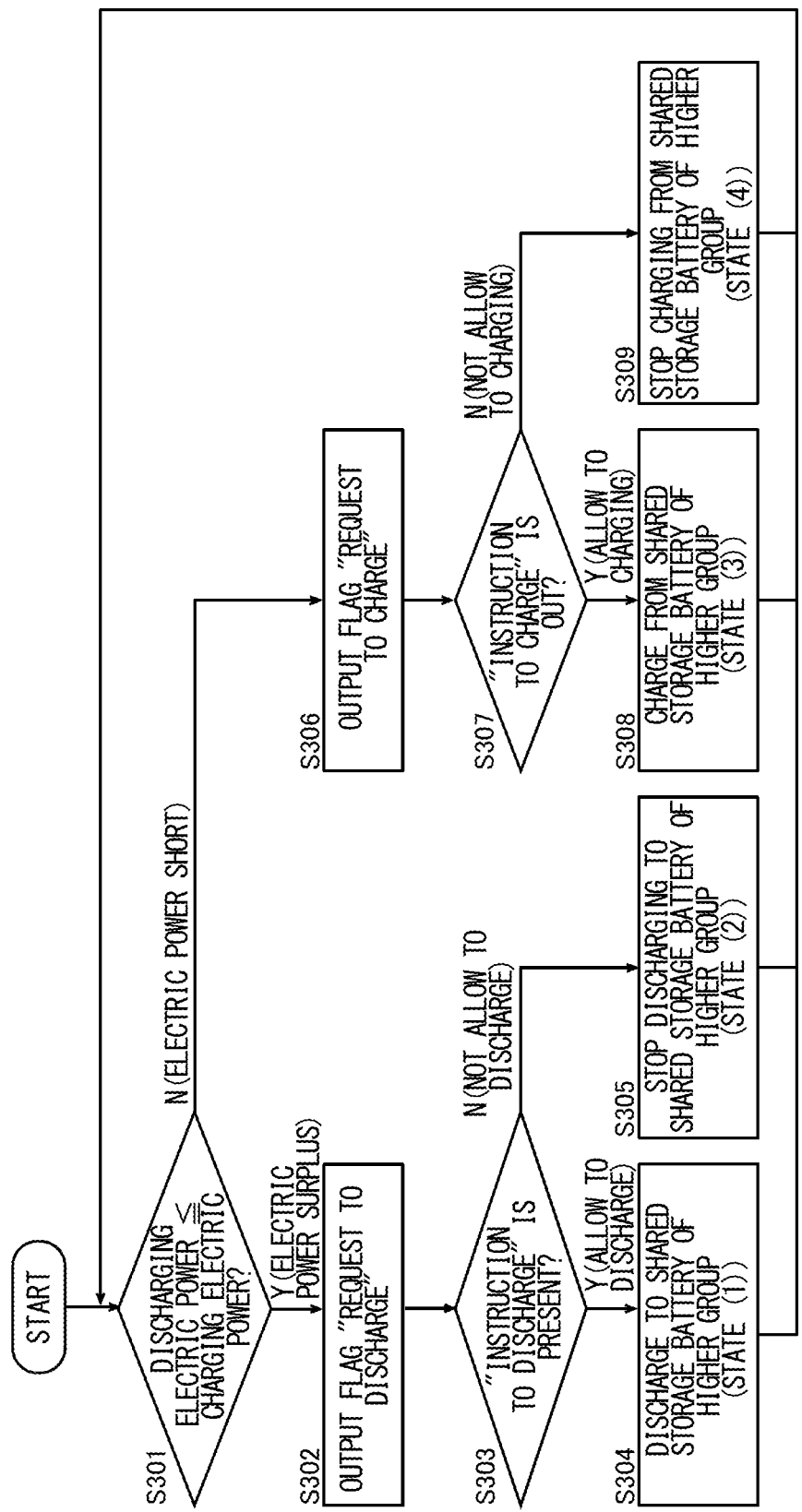
FIG. 16 is an operation flowchart of the group control portion with respect to the higher group.

FIG. 16 is an operation flowchart of the group control portion 401 with respect to the higher group.

In Step S301, it is checked whether or not the discharging electric power is equal or lower than the charging electric power in the shared storage battery 402. Here, if it is decided that the discharging electric power is equal or lower than the charging electric power, it is regarded that the shared storage battery 402 is in the power surplus state, and the flow goes to Step S302. On the other hand, if it is decided that the discharging electric power is not equal or lower than charging electric power, it is regarded that the shared storage battery 402 is in the power shortage state, and the flow goes to Step S306.

If it is decided in Step S301 that the discharging electric power is equal or lower than the charging electric power, in Step S302, the request to discharge flag that means to perform the DC power discharging of the surplus electric power of its own group 400 to the higher group side is output to the upper group control portion 409.

After that, in Step S303, a content of the instruction to discharge replied from the upper group control portion 409 is checked. Here, if the instruction to discharge that means to allow the DC power discharging of its own group 400 is confirmed, the flow goes to Step S304. On the other hand, if the instruction to discharge that means not to allow the DC power discharging of its own group 400 is confirmed, the flow goes to Step S305.

In Step S303, if the instruction to discharge that means to allow the DC power discharging of its own group 400 is confirmed, the switch d1 is turned on in Step S304 so that the DC power discharging to the shared storage battery 410 of the higher group is performed. This state corresponds to the above-mentioned first operation state. After that, the flow goes back to Step S301.

On the other hand, if the instruction to discharge that means not to allow the DC power discharging of its own group 400 is confirmed in Step S303, the switch d1 is turned off in Step S305 in order to stop the DC power discharging of the shared storage battery 410 of the higher group. This state corresponds to the above-mentioned second operation state. After that, the flow goes back to Step S301.

In addition, if it is decided in Step S301 that the discharging electric power is not equal or lower than the charging electric power, the request to charge flag that means to compensate for the short electric power of its own group 400 with the DC power charging from the higher group side is output to the upper group control portion 409 in Step S306.

After that, in Step S307, a content of the instruction to charge replied from the upper group control portion 409 is checked. Here, if the instruction to charge that means to allow the DC power charging of its own group 400 is confirmed, the flow goes to Step S308. On the other hand, if the instruction to charge that means not to allow the DC power charging of its own group 400 is confirmed, the flow goes to Step S309.

In Step S307, if the instruction to charge that means to allow the DC power charging of its own group 400 is confirmed, the switch c1 is turned on in Step S308 so as to perform the DC power charging from the shared storage battery 410 of the higher group. This state corresponds to the above-mentioned third operation state. After that, the flow goes back to Step S301.

On the other hand, in Step S307, if the instruction to charge that means not to allow the DC power charging of its own group 400 is confirmed, the switch c1 is turned off in Step S309 so as to stop the DC power charging from the shared storage battery 410 of the higher group. This state corresponds to the above-mentioned fourth operation state. After that, the flow goes back to Step S301.

FIG. 17 is an operation list of the group control portion 401 with respect to the lower group (lower unit 300), which shows, in order from the left, numbers assigned to operation states, a result of monitoring electric power by the electric power monitoring portion 403, presence or absence of the request to charge or the request to discharge (the request to buy electricity or the request to sell electricity) output from the lower group control portion (unit control portion 300), a content of the instruction to charge or the instruction to discharge (the instruction to buy electricity or the instruction to sell electricity) output from the group control portion 401, on/off states of the switches c1 and c2 for charging, and on/off states of the switches d1 and d2 for discharging.

The first operation state is a state in which the electric power balance of the shared storage battery 402 is positive (surplus) but is not fully charged, and the requests to discharge are output from the plurality of units control portions 301 connected to the lower group. In this case, the group control portion 401 outputs to all the unit control portions 301 the instruction to discharge that means to allow (validate) the DC power discharging of the unit 300 (which is shown by "○" in the diagram).

Note that in the first operation state, no unit control portion 301 outputs the request to charge. Therefore, the group control portion 401 outputs to all the unit control portions 301 the instruction to charge that means not to allow (invalidate) the DC power discharging of the unit 300 (which is shown by "x" in the diagram).

In this first operation state, the group control portion 401 turns on the switch c2 and turns off the switch d2. With this switch control, the shared storage battery 402 is charged by the DC electric power discharged from the unit storage battery 302.

The second operation state is a state in which the electric power balance of the shared storage battery 402 is positive (surplus) but is not fully charged, and the requests to charge are output from the plurality of units control portions 301 connected to the lower group. In this case, the group control portion 401 outputs to all the unit control portions 301 the instruction to charge that means to allow (validate) the DC power discharging of the unit 300 (which is shown by "○" in the diagram).

Note that in the second operation state, no unit control portion 301 outputs the request to discharge. Therefore, the group control portion 401 outputs to all the unit control portions 301 the instruction to discharge that means not to allow (invalidate) the DC power discharging of the unit 300 (which is shown by "x" in the diagram).

In this second operation state, the group control portion 401 turns off the switch c2 and turns on the switch d2. With this switch control, the unit storage battery 302 is charged by the DC electric power discharged from the shared storage battery 402.

The third operation state is a state in which the electric power balance of the shared storage battery 402 is positive (surplus) but is not fully charged, and a part of the plurality of units control portions 301 connected to the lower group output the requests to discharge while the other part of the same output the requests to charge. In this case, the group control portion 401 outputs to the unit control portions 301 that have output the requests to discharge the instruction to discharge that means to allow (validate) the DC power discharging of the unit 300 (which is shown by "○" in the diagram). In addition, the group control portion 401 outputs to the unit control portions 301 that have output the requests to charge the instruction to charge that means to allow (validate) the DC power discharging of the unit 300 (which is shown by "○" in the diagram).

In this third operation state, the group control portion 401 turns on the switches c2 and d2. With this switch control, between the shared storage battery 402 and the unit storage battery 302 in the power surplus state, the shared storage battery 402 is charged by the DC electric power discharged from the unit storage battery 302. In addition, between the shared storage battery 402 and the unit storage battery 302 in the power shortage state, the unit storage battery 302 is charged by the DC electric power discharged from the shared storage battery 402.

The fourth operation state is a state in which the shared storage battery 402 is fully charged, and all the plurality of units control portions 301 connected to the lower group output the requests to discharge. In this case, the group control portion 401 outputs to all the unit control portions 301 the instruction to discharge that means not to allow (invalidate) the DC power discharging of the unit 300 (which is shown by "x" in the diagram).

Note that in the fourth operation state, no unit control portion 301 outputs the request to charge. Therefore, the group control portion 401 outputs to all the unit control portions 301 the instruction to charge that means not to allow (invalidate) the DC power discharging of the unit 300 (which is shown by "x" in the diagram).

In this fourth operation state, the group control portion 401 turns off the switches c2 and d2. With this switch control, the DC power discharging of the unit storage battery 302 is stopped.

A fifth operation state is a state in which the shared storage battery 402 is fully charged, and all the plurality of units control portions 301 connected to the lower group output the requests to charge. In this case, the group control portion 401 outputs to all the unit control portions 301 the instruction to charge that means to allow (validate) the DC power discharging of the unit 300 (which is shown by "○" in the diagram).

Note that in the fifth operation state, no unit control portion 301 outputs the request to discharge. Therefore, the group control portion 401 outputs to all the unit control portions 301 the instruction to discharge that means not to allow (invalidate) the DC power discharging of the unit 300 (which is shown by "x" in the diagram).

In this fifth operation state, the group control portion 401 turns off the switch c2 and turns on the switch d2. With this switch control, the unit storage battery 302 is charged by the DC electric power discharged from the shared storage battery 402.

A sixth operation state is a state in which the shared storage battery 402 is fully charged, and a part of the plurality of units control portions 301 connected to the lower group output the requests to discharge, and the other part of the same output the requests to charge. In this case, the group control portion 401 outputs to the unit control portions 301 that have output the requests to discharge the instruction to discharge that means not to allow (invalidate) the DC power discharging of the unit 300 (which is shown by "x" in the diagram). In addition, the group control portion 401 outputs to the unit control portions 301 that have output the requests to charge the instruction to charge that means to allow (validate) the DC power discharging of the unit 300 (which is shown by "○" in the diagram).

In this sixth operation state, the group control portion 401 turns off the switch c2 and turns on the switch d2. With this switch control, between the shared storage battery 402 and the unit storage battery 302 in the power surplus state, the DC power discharging of the unit storage battery 302 is stopped. In addition, between the shared storage battery 402 and the unit storage battery 302 in the power shortage state, the unit storage battery 302 is charged by the DC electric power discharged from the shared storage battery 402.

A seventh operation state is a state in which the electric power balance of the shared storage battery 402 is negative (short) and is not fully charged, and all the plurality of units control portions 301 connected to the lower group output the request to discharge. In this case, the group control portion 401 outputs to all the unit control portions 301 the instruction to discharge that means to allow (validate) the DC power discharging of the unit 300 (which is shown by "○" in the diagram).

Note that in the seventh operation state, no unit control portion 301 outputs the request to charge. Therefore, the group control portion 401 outputs to all the unit control portions 301 the instruction to charge that means not to allow (invalidate) the DC power discharging of the unit 300 (which is shown by "x" in the diagram).

In this seventh operation state, the group control portion 401 turns on the switch c2 and turns off the switch d2. With this switch control, the shared storage battery 402 is charged by the DC electric power discharged from the unit storage battery 302.

An eighth operation state is a state in which the electric power balance of the shared storage battery 402 is negative (short) and is not fully charged, and all the plurality of units control portions 301 connected to the lower group output the requests to charge. In this case, the group control portion 401 outputs to all the unit control portions 301 the instruction to charge that means not to allow (invalidate) the DC power discharging of the unit 300 (which is shown by "x" in the diagram).

Note that in the eighth operation state, no unit control portion 301 outputs the request to discharge. Therefore, the group control portion 401 outputs to all the unit control portions 301 the instruction to discharge that means not to allow (invalidate) the DC power discharging of the unit 300 (which is shown by "x" in the diagram).

In this eighth operation state, the group control portion 401 turns off the switches c2 and d2. With this switch control, the DC power charging of the unit storage battery 302 is stopped.

A ninth operation state is a state in which the electric power balance of the shared storage battery 402 is negative (surplus) and is not fully charged, and a part of the plurality of units control portions 301 connected to the lower group output requests to discharge while the other part of the same output the requests to charge. In this case, the group control portion 401 outputs to the unit control portions 301 that have output the requests to discharge the instruction to discharge that means to allow (validate) the DC power discharging of the unit 300 (which is shown by "○" in the diagram). In addition, the group control portion 401 outputs to the unit control portions 301 that have output the requests to charge the instruction to charge that means not to allow (invalidate) the DC power discharging of the unit 300 (which is shown by "x" in the diagram).

In this ninth operation state, the group control portion 401 turns on the switch c2 and turns off the switch d2. With this switch control, between the shared storage battery 402 and the unit storage battery 302 in the power surplus state, the shared storage battery 402 is charged by the DC electric power discharged from the unit storage battery 302. In addition, between the shared storage battery 402 and the unit storage battery 302 in the power shortage state, the DC power charging of the unit storage battery 302 is stopped.

FIG. 18 is an operation flowchart of the group control portion 401 with respect to the lower group (lower unit).

In Step S401, it is checked whether or not the discharging electric power is equal or lower than the charging electric power in the shared storage battery 402. Here, if it is decided that the discharging electric power is equal or lower than the charging electric power, it is regarded that the shared storage battery 402 is in the power surplus state, and the flow goes to Step S402. On the other hand, if it is decided that the discharging electric power is not equal or lower than the charging electric power, it is regarded that the shared storage battery 402 is in the power shortage state, and the flow goes to Step S410.

If it is decided in Step S401 that the discharging electric power is equal or lower than the charging electric power, it is checked in Step S402 whether or not the shared storage battery 402 is fully charged. Here, if it is decided that the shared storage battery 402 is not fully charged, it is regarded that the shared storage battery 402 has a vacant capacity, and the flow goes to Step S403. On the other hand, if it is decided that the shared storage battery 402 is fully charged, it is regarded that the shared storage battery 402 has no vacant capacity, and the flow goes to Step S409.

If it is decided in Step S402 that the shared storage battery 402 is not fully charged, it is checked in Step S403 whether or not the unit control portion 301 has output the request to discharge (request to sell electricity) that means to discharge (sell) the surplus electric power of the unit 300 to the group 400. Here, if it is decided that the unit control portion 301 has output the request to discharge, the flow goes to Step S404. On the other hand, if it is decided that the unit control portion 301 has not output the request to discharge, the flow goes to Step S407.

If it is decided in Step S403 that the unit control portion 301 has output the request to discharge, as a content of the instruction to discharge to be replied to the unit control portion 301, a flag that means to allow the DC power discharging of the unit 300 is output in Step S404. This state corresponds to the above-mentioned first operation state or the third operation state.

On the other hand, if it is decided in Step S403 that the unit control portion 301 has not output the request to discharge, as a content of the instruction to discharge to be replied to the unit control portion 301, the flag that means to allow the DC power discharging of the unit 300 is stopped in Step S407. In other words, as a content of the instruction to discharge to be replied to the unit control portion 301, a flag that means not to allow the DC power discharging of the unit 300 is output. This state corresponds to the above-mentioned second operation state.

In addition, if it is decided in Step S402 that the shared storage battery 402 is fully charged, in Step S409, as a content of the instruction to discharge to be replied to the unit control portion 301, the flag that means to allow the DC power discharging of the unit 300 is stopped. In other words, as a content of the instruction to discharge to be replied to the unit control portion 301, the flag that means not to allow the DC power discharging of the unit 300 is output. This state corresponds to the above-mentioned fourth operation state, the fifth operation state, or the sixth operation state.

After performing one of Steps S404, S407, and S409, it is checked in Step S405 whether or not the unit control portion 301 has output a request to charge that means to compensate for the short electric power of the unit 300 by charging (buying) electricity from the group 400 (request to buy electricity). Here, if it is decided that the unit control portion 301 has output the request to charge, the flow goes to Step S406. On the other hand, if it is decided that the unit control portion 301 has not output the request to charge, the flow goes to Step S408.

If it is decided in Step S405 that the unit control portion 301 has output the request to charge, as a content of the instruction to charge to be replied to the unit control portion 301, the flag that means to allow the DC power discharging of the unit 300 is output in Step S406. This state corresponds to the above-mentioned second operation state, the third operation state, the fifth operation state, or the sixth operation state. After that, the flow goes back to Step S401.

On the other hand, if it is decided in Step S405 that the unit control portion 301 has not output the request to charge, as a content of the instruction to charge to be replied to the unit control portion 301, the flag that means to allow the DC power discharging of the unit 300 is stopped in Step S408. In other words, as a content of the instruction to charge to be replied to the unit control portion 301, the flag that means not to allow the DC power discharging of the unit 300 is output. This state corresponds to the above-mentioned first operation state, or the fourth operation state. After that, the flow goes back to Step S401.

In addition, if it is decided in Step S401 that the discharging electric power is not equal or lower than the charging electric power, it is checked in Step S410 whether or not the unit control portion 301 has output the request to discharge that means to discharge (sell) the surplus electric power of the unit 300 to the group 400 (request to sell electricity). Here, if it is decided that the unit control portion 301 has output the request to discharge, the flow goes to Step S411. On the other hand, if it is decided that the unit control portion 301 has not output the request to discharge, the flow goes to Step S413.

If it is decided in Step S410 that the unit control portion 301 has output the request to discharge, as a content of the instruction to discharge to be replied to the unit control portion 301, the flag that means to allow the DC power discharging of the unit 300 is output in Step S411. This state corresponds to the above-mentioned seventh operation state or the ninth operation state.

On the other hand, if it is decided in Step S410 that the unit control portion 301 has not output the request to discharge, as a content of the instruction to discharge to be replied to the unit control portion 301, the flag that means to allow the DC power discharging of the unit 300 is stopped in Step S413. In other words, as a content of the instruction to discharge to be replied to the unit control portion 301, the flag that means not to allow the DC power discharging of the unit 300 is output. This state corresponds to the above-mentioned eighth operation state.

In Step S412 after performing one of Steps S411 and S413, regardless whether or not the unit control portion 301 has output the request to charge that means to compensate the short electric power of the unit 300 by charging (buying) electricity from the group 400 (request to buy electricity), as a content of the instruction to charge to be replied to the unit control portion 301, the flag that means to allow the DC power discharging of the unit 300 is stopped. In other words, as a content of the instruction to charge to be replied to the unit control portion 301, the flag that means not to allow the DC power discharging of the unit 300 is output. This state corresponds to the above-mentioned seventh operation state, the eighth operation state, or the ninth operation state. After that, the flow goes back to Step S401.

Figure 19:
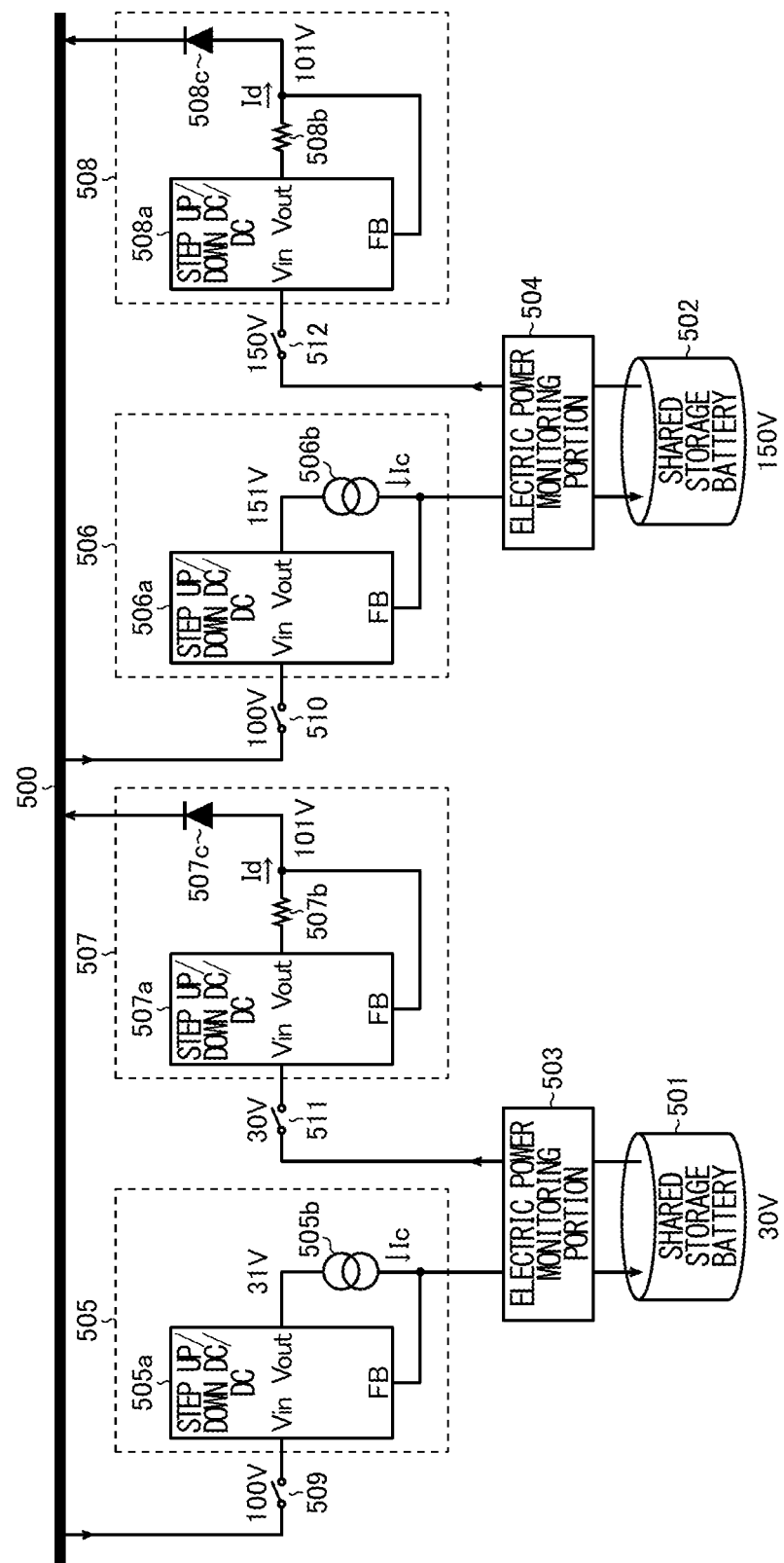
FIG. 19 is a schematic diagram illustrating charge/discharge control of a shared electric power line.

FIG. 19 is a schematic diagram illustrating charge/discharge control of the shared electric power line. On charging paths from a shared electric power line 500 to shared storage batteries 501 and 502, there are disposed charge control portions 505 and 506, respectively. On discharging path from the shared storage batteries 501 and 502 to the shared electric power line 500, there are disposed discharge control portions 507 and 508, respectively. Between the shared electric power line 500 and the charge control portion 505 or 506, there is disposed a switch 509 or 510 for charging control. Between the shared storage battery 501 or 502 and the discharge control portion 507 or 508, there is disposed a switch 511 or 512 for discharging control.

The charge control portion 505 includes a step-up/down DC/DC converter 505a, and a constant current driver 505b. When charging the shared storage battery 501 from the shared electric power line 500, the charge control portion 505 converts the DC electric power supplied from the shared electric power line 500 into a level suitable for charging the shared storage battery 501. For instance, if an optimal charging voltage of the shared storage battery 501 is 30 V, a target output voltage of the step-up/down DC/DC converter 505a should be set to approximately 31 V (an optimal charging voltage of 30 V of the shared storage battery 501 plus a drive voltage of 1 V of the constant current driver 505b). With this setting, for example, if an input voltage Vin from the shared electric power line 500 is 100 V, the step-up/down DC/DC converter 505a steps down the input voltage Vin of 100 V to generate an output voltage Vout of 31 V, and outputs this output voltage Vout to the shared storage battery 501. Note that thanks to the constant current driver 505b, charging current Ic into the shared storage battery 501 can be maintained to be a predetermined value.

The charge control portion 506 includes the step-up/down DC/DC converter 506a and the constant current driver 506b. When charging the shared storage battery 502 from the shared electric power line 500, the charge control portion 506 converts the DC electric power supplied from the shared electric power line 500 into a level suitable for charging the shared storage battery 502. For instance, if an optimal charging voltage of the shared storage battery 502 is 150 V, a target output voltage of the step-up/down DC/DC converter 506a should be set to approximately 151 V (an optimal charging voltage 150 V of the shared storage battery 502 plus a drive voltage of 1 V of the constant current driver 506b). With this setting, for example, if the input voltage Vin from the shared electric power line 500 is 100 V, the step-up/down DC/DC converter 506a steps up the input voltage Vin of 100 V to generate the output voltage Vout of 151 V, and outputs this output voltage Vout to the shared storage battery 502. Note that thanks to the constant current driver 506b, charging current Ic into the shared storage battery 502 can be maintained to be a predetermined value.

The discharge control portion 507 includes a step-up/down DC/DC converter 507a, a resistor 507b for detecting discharge current Id, and a diode for preventing a reverse current 507c. When discharging the shared storage battery 501 to the shared electric power line 500, the discharge control portion 507 converts the DC electric power discharged from the shared storage battery 501 into a level suitable for supplying to the shared electric power line 500. For instance, if an applied voltage to the shared electric power line 500 is 100 V, a target output voltage of the step-up/down DC/DC converter 507a should be set to approximately 101 V (a minimum voltage level necessary for discharging to the shared electric power line 500 by the discharge current Id). With this setting, for example, if the input voltage Vin from the shared storage battery 501 is 30 V, the step-up/down DC/DC converter 507a steps up the input voltage Vin of 30 V to generate the output voltage Vout of 101 V, and outputs this output voltage Vout to the shared electric power line 500.

The discharge control portion 508 includes a step-up/down DC/DC converter 508a, a resistor 508b for detecting discharge current Id, and a diode for preventing a reverse current 508c. When discharging the shared storage battery 502 to the shared electric power line 500, the discharge control portion 508 converts the DC electric power discharged from the shared storage battery 502 into a level suitable for supplying to the shared electric power line 500. For instance, if the applied voltage to the shared electric power line 500 is 100 V, a target output voltage of the step-up/down DC/DC converter 508a should be set to approximately 101 V (a minimum voltage level necessary for discharging to the shared electric power line 500 by the discharge current Id). With this setting, for example, if the input voltage Vin from the shared storage battery 502 is 150 V, the step-up/down DC/DC converter 508a steps down the input voltage Vin of 150 V to generate the output voltage Vout of 101 V, and outputs this output voltage Vout to the shared electric power line 500.

Note that the charge control portions 505 and 506, and the discharge control portions 507 and 508 may always work, but it is desirable to control on and off of operation states of the charge control portions 505 and 506, and the discharge control portions 507 and 508 in accordance with on and off of the switches 509 and 510 for charging control and the switches 511 and 512 for discharging control, in order to reduce unnecessary power consumption.

In this case, as an enable signal for turning on and off the operation states of the charge control portions 505 and 506, it is possible to use the on/off control signals of the switches 509 and 510. Alternatively, it is possible to use the instruction to charge or the instruction to buy electricity communicated between the upper class group control portion (including the route control portion) and the lower class group control portion (including the unit control portion).

In addition, as an enable signal for turning on and off operation states of the discharge control portions 507 and 508, it is possible to use the on/off control signals of the switches 511 and 512. Alternatively, it is possible to use the instruction to discharge or the instruction to sell electricity communicated between the upper class group control portion (including the route control portion) and the lower class group control portion (including the unit control portion).

FIG. 20 is a schematic diagram illustrating a structural example of the route. A plurality of groups 400 of the uppermost class (N-th class in FIG. 10) belong to a route 600 in this structural example. The route 600 includes a route control portion 601, a shared storage battery 602, an electric power monitoring portion 603, a charge control portion 604, a discharge control portion 605, a shared electric power line 606, an electric power monitoring portion 607, a discharge control portion 608, an AC/DC converter 609, a DC/AC converter 610, an electric power monitoring portion 611, switches e1 and e2 for charging, and switches f1 and f2 for discharge. Note that FIG. 20 is a diagram in which components of the route 600 are noted, and components outside the route (components of the group 400) are illustrated only partially.

When the route control portion 601 performs charge/discharge of the DC electric power between the shared storage battery 602 of the route 600 and the shared storage battery 402 of the group 400, it receives the request to charge or the request to discharge from the group control portion 401, and as reply to the same, outputs the instruction to charge or the instruction to discharge to the group control portion 401.

Note that the route control portion 601 includes an electric power company interface portion 601a, a charge/discharge control portion 601b, a lower group electric power monitoring portion 601c, and a lower group controller 601d. The electric power company interface portion 601a receives a monitor result of the electric power monitoring portion 611. The charge/discharge control portion 601b performs on/off control of the switches e1 and e2 and on/off control of the switches f1 and f2. The lower group electric power monitoring portion 601c integrally manages billing information of each of the plurality of groups 400 (trade balance of the DC electric power). The lower group controller 601d performs intercommunication with the group control portion 401.

The shared storage battery 602 is connected to the shared electric power line 606, and performs charge/discharge of the DC electric power with the shared storage battery 402 of the lower group 400. In addition, the shared storage battery 602 performs buying/selling electricity with an electric power company 612 via the AC/DC converter 609 or the DC/AC converter 610. In other words, the shared storage battery 602 of the route 600 is charged by "DC power charging from the shared storage battery 402 of the lower group 400" and "AC power buying from the electric power company 612". In addition, the shared storage battery 602 of the route 600 is discharged by "DC power discharging to the shared storage battery 402 of the lower group 400" and "AC power selling to the electric power company 612".

The electric power monitoring portion 603 monitors the stored electricity of the shared storage battery 602. For instance, if the stored electricity of the shared storage battery 602 is 90% or higher of its maximum value, the electric power monitoring portion 603 decides that the shared storage battery 602 is substantially fully charged state. If the stored electricity is 30% or higher and lower than 90%, it is decided to be a stable state. If the stored electricity is lower than 30%, it is decided to be in the power shortage state.

The charge control portion 604 converts the DC electric power supplied from the shared electric power line 606 or the AC/DC converter 609 into a level suitable for charging the shared storage battery 602.

The discharge control portion 605 converts the DC electric power discharged from the shared storage battery 602 into a level suitable for supplying to the shared electric power line 606 or the DC/AC converter 610.

The shared electric power line 606 is a path for charging and discharging the DC electric power between the shared storage battery 602 of the lower group 400 and the shared storage battery 602 of the route 600.

The electric power monitoring portion 607 is an electric power meter that accumulates the DC electric power amount traded between the group 400 and the shared electric power line 606 for a predetermined period (for example, one month), so as to obtain billing information (trade balance of the DC electric power) with respect to the group 400.

The discharge control portion 608 converts the DC electric power discharged from the shared storage battery 402 of the group 400 into a level suitable for supplying to the shared electric power line 606.

The AC/DC converter 609 converts the AC electric power supplied from the electric power company 612 into the DC electric power and outputs the DC electric power to the shared storage battery 602.

The DC/AC converter 610 converts the DC electric power discharged from the shared storage battery 602 into AC electric power and outputs the AC electric power to the electric power company 612.

The electric power monitoring portion 611 is an electric power meter that accumulates AC electric power amount traded between the route 600 and the electric power company 612 for a predetermined period (for example, one month), so as to obtain billing information (trade balance of the AC electric power) with respect to the route 600.

The electric power company 612 performs buying and selling of the AC electric power with the route 600.

The switch e1 is controlled to be turned on and off by the route control portion 601 so as to make and break a connection of the charging path from the AC/DC converter 609 to the shared storage battery 602. The switch e2 is controlled to be turned on and off by the route control portion 601 so as to make and break a connection of the charging path from the shared electric power line 606 to the shared storage battery 602.

The switch f1 is controlled to be turned on and off by the route control portion 601 so as to make and break a connection of the discharging path from the shared storage battery 602 to the DC/AC converter 610. The switch f2 is controlled to be turned on and off by the route control portion 601 so as to make and break a connection of the discharging path from the shared storage battery 602 to the shared electric power line 606.

FIG. 21 is an operation list of the route control portion 601, which shows, in order from the left, numbers assigned to operation states, a result of monitoring electric power of the electric power monitoring portion 603, presence or absence of the request to charge or the request to discharge output from the lower group control portion 401, a content of the instruction to charge or the instruction to discharge output from the route control portion 601, on/off states of the switches e1 and e2 for charging, on/off states of the switches f1 and f2 for discharging, and a buying/selling electricity state with the electric power company 612.

The first operation state is a state in which the shared storage battery 602 is substantially fully charged (90% or higher), and all the plurality of group control portions 401 connected to the lower group output the requests to discharge. In this case, the route control portion 601 outputs to all the group control portions 401 the instruction to discharge that means to allow (validate) the DC power discharging of the group 400 (which is shown by "○" in the diagram).

Note that in the first operation state, no group control portion 401 has output the request to charge. Therefore, the route control portion 601 outputs to all the group control portions 401 the instruction to charge that means not to allow (invalidate) the DC power charging of the group 400 (which is shown by "x" in the diagram).

In this first operation state, the route control portion 601 turns on the switches e2 and f1 and turns off the switches e1 and f2. With this switch control, between the shared storage battery 602 and the shared storage battery 402, the shared storage battery 602 is charged by the DC electric power discharged from the shared storage battery 402. In addition, between the shared storage battery 602 and the electric power company 612, the DC electric power discharged from the shared storage battery 602 is converted into the AC electric power and is sold to the electric power company.

The second operation state is a state in which the shared storage battery 602 is substantially fully charged (90% or higher), and all the plurality of group control portions 401 connected to the lower group output the requests to charge. In this case, the route control portion 601 outputs to all the group control portions 401 the instruction to charge that means to allow (validate) the DC power charging of the group 400 (which is shown by "○" in the diagram).

Note that in the second operation state, no group control portion 401 outputs the request to discharge. Therefore, the route control portion 601 outputs to all the group control portions 401 the instruction to discharge that means not to allow (invalidate) the DC power discharging of the group 400 (which is shown by "x" in the diagram).

In this second operation state, the route control portion 601 turns off the switches e1, e2, and f1, and turns on the switch f2. With this switch control, the shared storage battery 402 is charged by the DC electric power discharged from the shared storage battery 602. Note that the buying/selling electricity with the electric power company 612 is stopped.

The third operation state is a state in which the shared storage battery 602 is substantially fully charged (90% or higher), and a part of the plurality of group control portions 401 connected to the lower group output the requests to discharge while the other part of the same output the requests to charge. In this case, the route control portion 601 outputs to the group control portions 401 that have output the request to discharge the instruction to discharge that means to allow (validate) the DC power discharging of the group 400 (which is shown by "o" in the diagram), and outputs to the group control portions 401 that have output the request to charge the instruction to charge that means to allow (validate) the DC power charging of the group 400 (which is shown by "o" in the diagram).

In this third operation state, the route control portion 601 turns off the switch e1 and turns on the switches c2, d1, and d2. With this switch control, between the shared storage battery 602 and the shared storage battery 402 in the power surplus state, the shared storage battery 602 is charged by the DC electric power discharged from the shared storage battery 402. In addition, between the shared storage battery 602 and the shared storage battery 402 in the power shortage state, the shared storage battery 402 is charged by the DC electric power discharged from the shared storage battery 602. Further, between the shared storage battery 602 and the electric power company 612, the DC electric power discharged from the shared storage battery 602 is converted into the AC electric power and is sold to the electric power company 612.

The fourth operation state is a state in which the stored electricity of the shared storage battery 602 is in the stable state (30% or higher and lower than 90%), and all the plurality of group control portions 401 connected to the lower group output the requests to discharge. In this case, the route control portion 601 outputs to all the group control portions 401 the instruction to discharge that means to allow (validate) the DC power discharging of the group 400 (which is shown by "o" in the diagram).

Note that in the fourth operation state, no group control portion 401 outputs the request to charge. Therefore, the route control portion 601 outputs to all the group control portions 401 the instruction to charge that means not to allow (invalidate) the DC power charging of the group 400 (which is shown by "x" in the diagram).

In this fourth operation state, the route control portion 601 turns on the switch e2 and turns off the switches e1, f1, and f2. With this switch control, between the shared storage battery 602 and the shared storage battery 402, the shared storage battery 602 is charged by the DC electric power discharged from the shared storage battery 402. Note that buying/selling electricity with the electric power company 612 is stopped.

The fifth operation state is a state in which the stored electricity of the shared storage battery 602 is in the stable state (30% or higher and lower than 90%), and all the plurality of group control portions 401 connected to the lower group output the requests to charge. In this case, the route control portion 601 outputs to all the group control portions 401 the instruction to charge that means to allow (validate) the DC power charging of the group 400 (which is shown by "o" in the diagram).

Note that in the fifth operation state, no group control portion 401 outputs the request to discharge. Therefore, the route control portion 601 outputs to all the group control portions 401 the instruction to discharge that means not to allow (invalidate) the DC power discharging of the group 400 (which is shown by "x" in the diagram).

In this fifth operation state, the route control portion 601 turns off the switches e1, e2, and f1, and turns on the switch f2. With this switch control, the shared storage battery 402 is charged by the DC electric power discharged from the shared storage battery 602. Note that buying/selling electricity with electric power company 612 is stopped.

The sixth operation state is a state in which the stored electricity of the shared storage battery 602 is in the stable state (30% or higher and lower than 90%), and a part of the plurality of group control portions 401 connected to the lower group output the requests to discharge while the other part of the same output the requests to charge. In this case, the route control portion 601 output to the group control portions 401 that have output the requests to discharge the instruction to discharge that means to allow (validate) the DC power discharging of the group 400 (which is shown by "o" in the diagram), and outputs to the group control portions 401 that have output the requests to charge the instruction to charge that means to allow (validate) the DC power charging of the group 400 (which is shown by "o" in the diagram).

In this sixth operation state, the route control portion 601 turns off the switches e1 and f1, and turns on the switches e2 and f2. With this switch control, between the shared storage battery 602 and the shared storage battery 402 in the power surplus state, the shared storage battery 602 is charged by the DC electric power discharged from the shared storage battery 402. In addition, between the shared storage battery 602 and the shared storage battery 602 in the power shortage state, the shared storage battery 402 is charged by the DC electric power discharged from the shared storage battery 602. Note that buying/selling electricity with the electric power company 612 is stopped.

The seventh operation state is a state in which the shared storage battery 602 is in the power shortage state (lower than 30%), and all the plurality of group control portions 401 connected to the lower group output the requests to discharge. In this case, the route control portion 601 outputs to all the group control portions 401 the instruction to discharge that means to allow (validate) the DC power discharging of the group 400 (which is shown by "o" in the diagram).

Note that in the seventh operation state, no group control portion 401 outputs the request to charge. Therefore, the route control portion 601 outputs to all the group control portions 401 the instruction to charge that means not to allow (invalidate) the DC power charging of the group 400 (which is shown by "x" in the diagram).

In this seventh operation state, the route control portion 601 turns off the switches e1, f1, and f2, and turns on the switch e2. With this switch control, the shared storage battery 602 is charged by the DC electric power discharged from the shared storage battery 402. Note that buying/selling electricity with the electric power company 612 is stopped.

The eighth operation state is a state in which the shared storage battery 602 is in the power shortage state (lower than 30%), and all the plurality of group control portions 401 connected to the lower group output the requests to charge. In this case, the route control portion 601 outputs to all the group control portions 401 the instruction to charge that means not to allow (invalidate) the DC power charging of the group 400 (which is shown by "x" in the diagram).

Note that in the eighth operation state, no group control portion 401 outputs the request to discharge. Therefore, the route control portion 601 outputs to all the group control portions 401 the instruction to discharge that means not to allow (invalidate) the DC power discharging of the group 400 (which is shown by "x" in the diagram).

In this eighth operation state, the route control portion 601 turns on the switch e1, and turns off the switches e2, f1, and f2. With this switch control, between the shared storage battery 602 and the electric power company 612, the AC electric power bought from the electric power company 612 is converted into the DC electric power, and the shared storage battery 602 is charged by this DC electric power. Note that charge/discharge with the shared storage battery 402 is stopped.

The ninth operation state is a state in which the shared storage battery 602 is in the power shortage state (lower than 30%), and a part of the plurality of group control portions 401 connected to the lower group output the requests to discharge while the other part of the same output the requests to charge. In this case, the route control portion 601 outputs to the group control portions 401 that have output the requests to discharge the instruction to discharge that means to allow (validate) the DC power discharging of the group 400 (which is shown by "○" in the diagram), and outputs to the group control portions 401 that have output the requests to charge the instruction to charge that means not to allow (invalidate) the DC power charging of the group 400 (which is shown by "x" in the diagram).

In this ninth operation state, the route control portion 601 turns on the switches e1 and e2, and turns off the switches d1 and d2. With this switch control, between the shared storage battery 602 and the shared storage battery 402 in the power surplus state, the shared storage battery 602 is charged by the DC electric power discharged from the shared storage battery 402. In addition, between the shared storage battery 602 and the shared storage battery 402 in the power shortage state, the DC power charging of the shared storage battery 402 is stopped. In addition, between the shared storage battery 602 and the electric power company 612, the AC electric power bought from the electric power company 612 is converted into the DC electric power, and the shared storage battery 602 is charged by this DC electric power.

FIG. 22 is an operation flowchart of the route control portion 601.

It is checked in Step S501 whether or not the stored electricity of the shared storage battery 602 is 90% or higher of the maximum value. Here, if it is decided that the stored electricity of the shared storage battery 602 is 90% or higher of the maximum value, it is regarded that the shared storage battery 602 is substantially fully charged, and the flow goes to Step S502. On the other hand, if it is decided that the stored electricity of the shared storage battery 602 is not the 90% or higher of the maximum value, it is regarded that the shared storage battery 602 can be charged, and the flow goes to Step S508.

If it is decided in Step S501 that the stored electricity of the shared storage battery 602 is 90% or higher of the maximum value, it is checked in Step S502 whether or not the group control portion 401 has output the request to discharge that means to discharge the surplus electric power of the group 400 to the route 600. Here, if it is decided that the group control portion 401 has output the request to discharge, the flow goes to Step S503. On the other hand, if it is decided that the group control portion 401 has not output the request to discharge, the flow goes to Step S506.

If it is decided in Step S502 that the group control portion 401 has output the request to discharge, the AC power selling from the shared storage battery 602 to the electric power company 612 is performed in Step S503, and as a content of the instruction to discharge replied to the group control portion 401, the flag that means to allow the DC power discharging of the group 400 is output. This state corresponds to the above-mentioned first operation state or the third operation state.

On the other hand, if it is decided in Step S502 that the group control portion 401 has not output the request to discharge, the AC power selling from the shared storage battery 602 to the electric power company 612 is stopped in Step S506, and as a content of the instruction to discharge replied to the group control portion 401, the flag that means to allow the DC power discharging of the group 400 is stopped. In other words, as a content of the instruction to discharge replied to the group control portion 401, a flag that means not to allow the DC power discharging of the group 400 is output. This state corresponds to the above-mentioned second operation state.

In addition, if it is decided in Step S501 that the stored electricity of the shared storage battery 602 is not 90% or higher of the maximum value, it is checked in Step S508 whether or not the stored electricity of the shared storage battery 602 is 30% or higher of the maximum value. Here, if it is decided that the stored electricity of the shared storage battery 602 is 30% or higher of the maximum value, it is regarded that the stored electricity of the shared storage battery 602 is in the stable state, and the flow goes to Step S509. On the other hand, if it is decided that the stored electricity of the shared storage battery 602 is not 30% or higher of the maximum value, it is regarded that the shared storage battery 602 is in the power shortage state, and the flow goes to Step S512.

In Step S508, if it is decided that the stored electricity of the shared storage battery 602 is 30% or higher of the maximum value, it is checked in Step S509 whether or not the group control portion 401 has output the request to discharge that means to discharge the surplus electric power of the group 400 to the route 600. Here, if it is decided that the group control portion 401 has output the request to discharge, the flow goes to Step S510. On the other hand, if it is decided that the group control portion 401 has not output the request to discharge, the flow goes to Step S511.

If it is decided in Step S509 that the group control portion 401 has output the request to discharge, as a content of the instruction to discharge replied to the group control portion 401, the flag that means to allow the DC power discharging of the group 400 is output in Step S510. This state corresponds to the above-mentioned fourth operation state, or the sixth operation state.

On the other hand, if it is decided in Step S509 that the group control portion 401 has not output the request to discharge, as a content of the instruction to discharge replied to the group control portion 401, the flag that means to allow the DC power discharging of the group 400 is stopped in Step S511. In other words, as a content of the instruction to discharge replied to the group control portion 401, the flag that means not to allow the DC power discharging of the group 400 is output. This state corresponds to the above-mentioned fifth operation state.

After any one of Steps S503, S506, S510, and S511, it is checked in Step S504 whether or not the group control portion 401 has output the request to charge that means to compensate for the short electric power of the group 400 by charging from the route 600. Here, if it is decided that the group control portion 401 has output the request to charge, the flow goes to Step S505. On the other hand, if it is decided that the group control portion 401 has not output the request to charge, the flow goes to Step S507.

If it is decided in Step S504 that the group control portion 401 has output the request to charge, as a content of the instruction to charge replied to the group control portion 401, a flag that means to allow the DC power charging of the group 400 is output in Step S505. This state corresponds to the above-mentioned second operation state, the third operation state, the fifth operation state, or the sixth operation state. After that, the flow goes back to Step S501.

On the other hand, if it is decided in Step S504 that the group control portion 401 has not output the request to charge, in Step S507, as a content of the instruction to charge replied to the group control portion 401, the flag that means to allow the DC power charging of the group 400 is stopped. In other words, as a content of the instruction to charge replied to the group control portion 401, a flag that means not to allow the DC power charging of the group 400 is output. This state corresponds to the above-mentioned first operation state, or the fourth operation state. After that, the flow goes back to Step S501.

In addition, if it is decided in Step S508 that the stored electricity of the shared storage battery 602 is not 30% or higher of the maximum value, it is checked in Step S512 whether or not the group control portion 401 has output the request to discharge that means to discharge the surplus electric power of the group 400 to the route 600. Here, if it is decided that the group control portion 401 has output the request to discharge, the flow goes to Step S513. On the other hand, if it is decided that the group control portion 401 has not output the request to discharge, the flow goes to Step S515.

If it is decided in Step S512 that the group control portion 401 has output the request to discharge, in Step S513, as a content of the instruction to discharge replied to the group control portion 401, the flag that means to allow the DC power discharging of the group 400 is output. This state corresponds to the above-mentioned seventh operation state or the ninth operation state.

On the other hand, if it is decided in Step S512 that the group control portion 401 has not output the request to discharge, as a content of the instruction to discharge replied to the group control portion 401, the flag that means to allow the DC power discharging of the group 400 is stopped in Step S515. In other words, as a content of the instruction to discharge replied to the group control portion 401, the flag that means not to allow the DC power discharging of the group 400 is output. This state corresponds to the above-mentioned eighth operation state.

After one of Steps S513 and S515, in Step S514, regardless that the group control portion 401 has output the request to charge that means to compensate for the short electric power of the group 400 by charging from the route 600, as a content of the instruction to charge replied to the group control portion 401, the flag that means to allow the DC power charging of the group 400 is stopped. In other words, as a content of the instruction to charge replied to the group control portion 401, the flag that means not to allow the DC power charging of the group 400 is output. This state corresponds to the above-mentioned seventh operation state, the eighth operation state, or the ninth operation state. After that, the flow goes back to Step S501.

Figure 23:
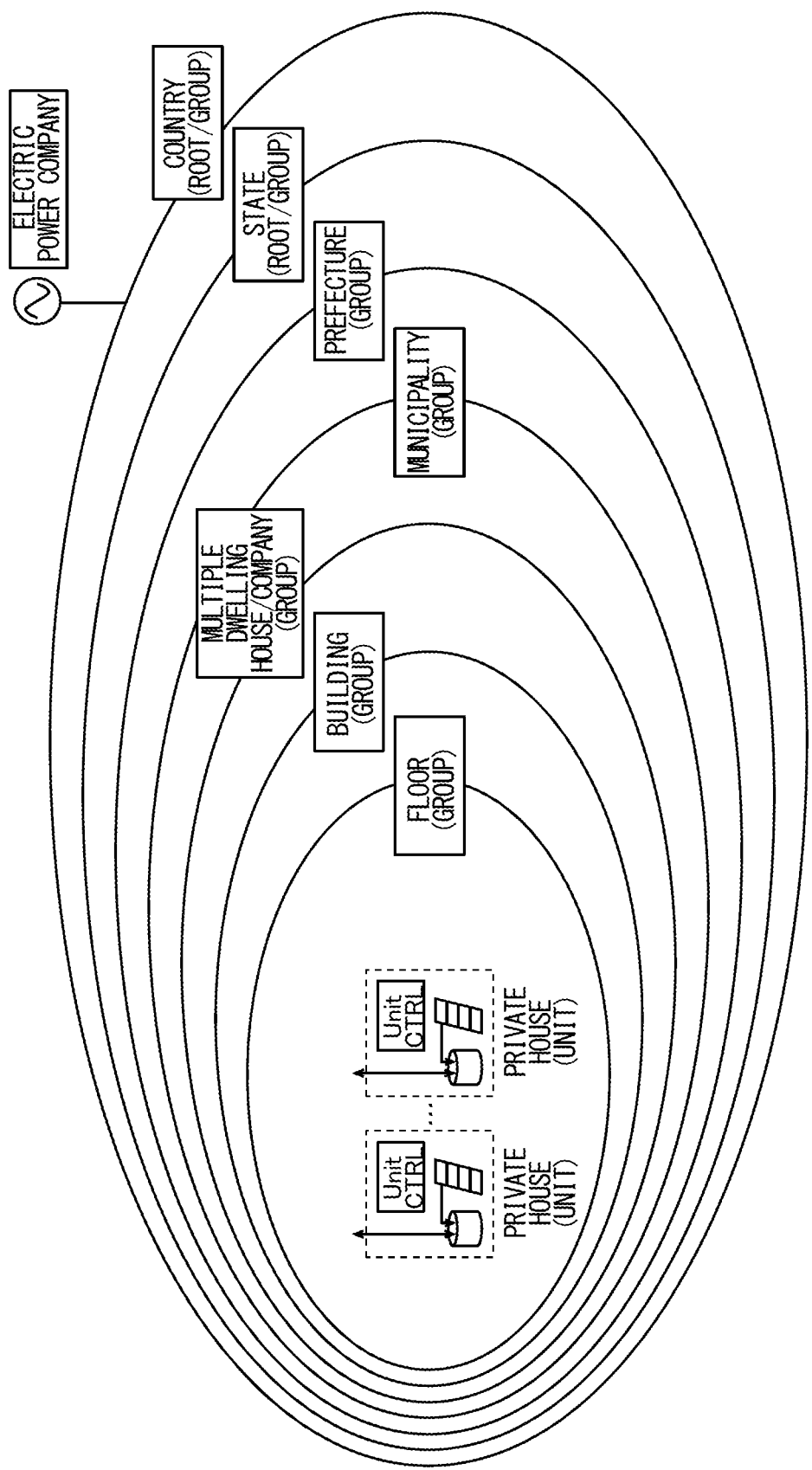
FIG. 23 is a conceptual diagram of the DC electric power network.

FIG. 23 is a conceptual diagram of the DC electric power network described above. Note that in this diagram, a private house is exemplified as the unit. In addition, as an example of the group to which the private house belongs, there are shown a floor of a multiple dwelling house, a building of the multiple dwelling house, a whole (or a company) of the multiple dwelling house, a municipality, and a prefecture. Further as a final route, there is shown a state or a country.

As illustrated in this diagram, by increasing hierarchical groups forming the DC electric power network, the DC electric power network can be expanded from a small group to a worldwide area. In particular, by establishing a large DC electric power network, the stored electricity of the whole DC electric power network can be maintained even if one district is in bad weather if another district is in fine weather. Therefore, the problem of the photovoltaic power generation system that the generated electric power is easily affected by weather can be solved.

Figure 24:
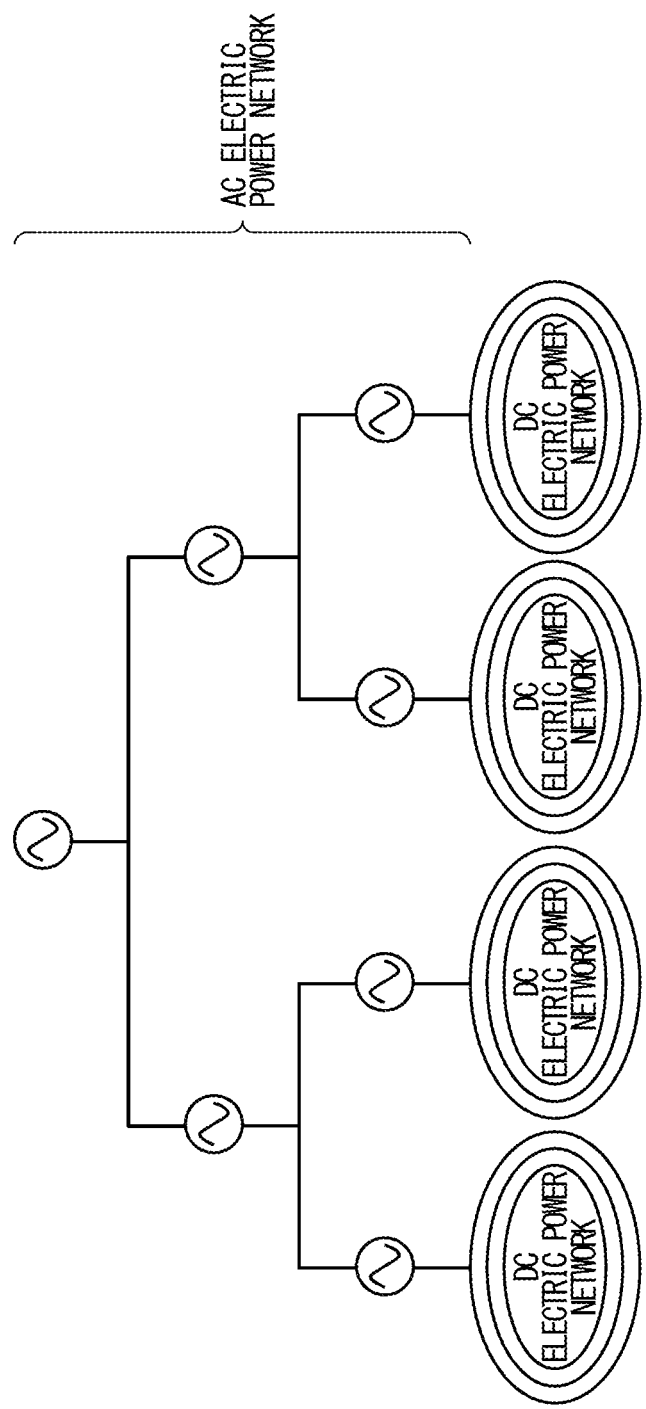
FIG. 24 is an interconnection diagram between the DC electric power network and an AC electric power network.

FIG. 24 is an interconnection diagram between the DC electric power network and the AC electric power network. As illustrated in this diagram, in a developing stage of expanding the DC electric power network, it is possible to achieve electric power sharing between distant DC electric power networks by interconnection with the AC electric power network as an existing infrastructure.

As described above, according to the second example too, it is possible to provide the electric power system including a first unit equipped with a first power source, a first rechargeable battery to which an output of the first power source is input, an a first power consuming portion to which an output of the first rechargeable battery is input; a second rechargeable battery; and an electric power line for sharing electric power between the first rechargeable battery and the second rechargeable battery. Further, in the case of the second example, the first power source (and the second power source) is a solar panel.

Here, the second example is based on a concept that emphasizes self-sufficiency by the photovoltaic power generation and DC electric power distribution avoiding a conversion loss between AC and DC. Therefore, the second example adopts the concept in which self-consuming and interchange of the photovoltaic power generation electric power is given high priority first, and selling electricity is performed if there is surplus.

In addition, the structure of the present invention can be modified variously from the above-mentioned embodiment without deviating from the spirit of the present invention. In other words, the above-mentioned embodiment is merely an example and should not be interpreted as a restriction. The technical scope of the present invention is defined not by the above description of the embodiment but by the claims, which should be interpreted to include all modifications belonging to the meaning and the scope equivalent to the claims.

Figure 25:
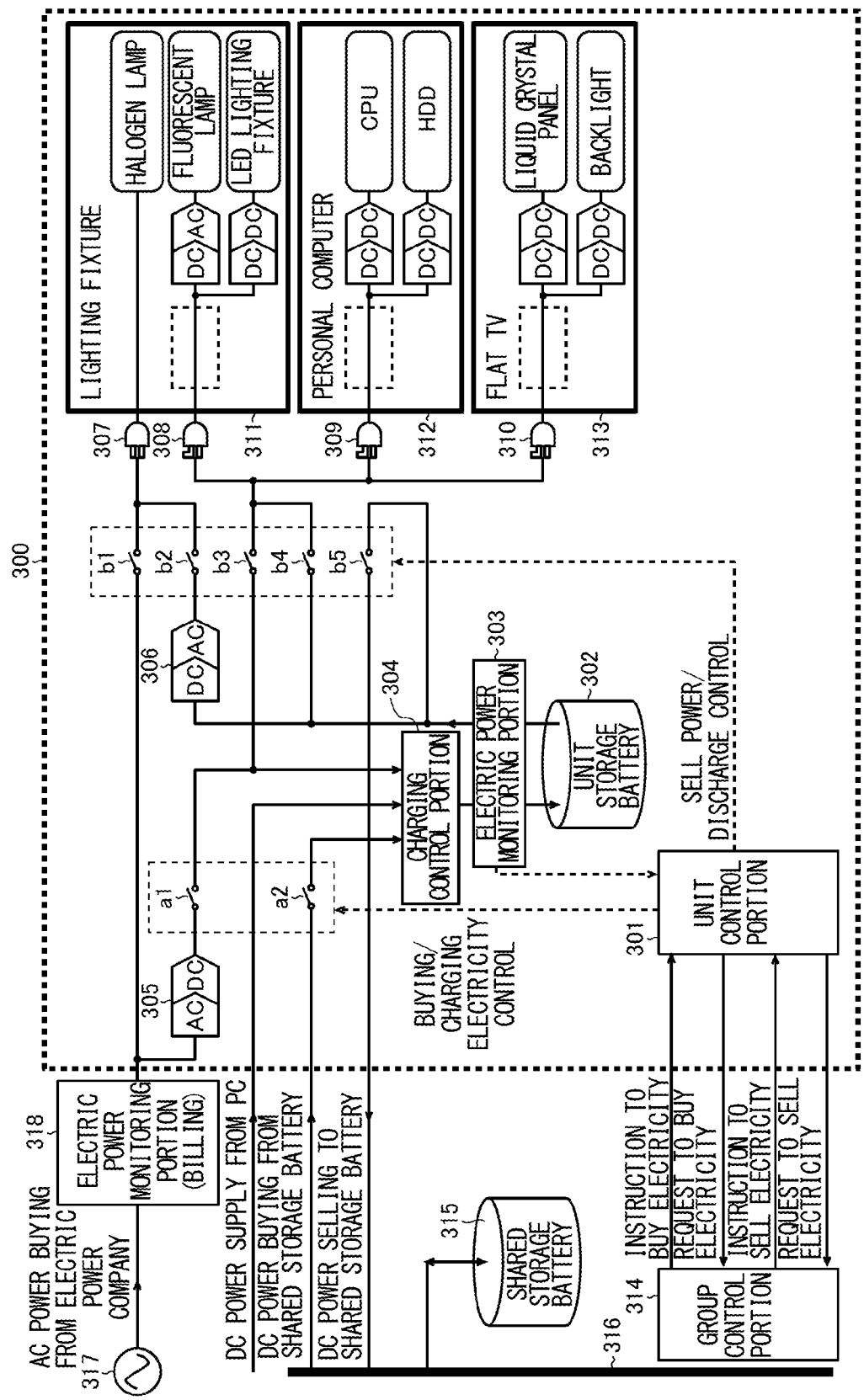
FIG. 25 is a schematic diagram illustrating a variation example of the unit.

For instance, as for the above-mentioned second example, FIG. 11 illustrates the structure without a charging path from the electric power company 317 to the unit storage battery 302 as an example for description, but the structure of the present invention is not limited to this. As illustrated in FIG. 25, it is possible to adopt a structure equipped with the charging path from the electric power company 317 to the unit storage battery 302. In this case, the unit storage battery 302 can be charged by "DC power supplying from the power conditioner (not shown)" and "DC power buying from the shared storage battery 315", as well as by "AC power buying from the electric power company 317". Note that when the DC electric power stored in the unit storage battery 302 is shared, the DC electric power stored by buying electricity from the electric power company 317 may be excluded from the sharing target, or on the contrary, it may be included in the sharing target.

INDUSTRIAL APPLICABILITY

The present invention provides an electric power supply system for a house having an electricity storing function.

EXPLANATION OF NUMERALS 8 photovoltaic power generation portion
24, 26 electric power input/output portion 36, 50 supply restricting portion
28 control portion
32 storage battery
42, 48 power consuming portion
52 external storage battery
54 supplying portion
46 distribution switchboard
100 multiple dwelling house
101 residential room
102 solar panel
103 power conditioner
104 distribution switchboard
105 electric power company (commercial AC power)
106, 107, 108 AC plug
109 lighting fixture
110 personal computer
111 flat television set
201 unit
201a unit control portion
201b solar panel
201c unit storage battery
202 shared storage battery
203 shared electric power line (first class)
204 group control portion (first class)
205 group (first class)
206 shared storage battery (first class)
207 shared electric power line (second class)
208 group control portion (second class)
209 group (second class)
210 shared storage battery (second class)
211 shared electric power line (third class)
212 group control portion (third class)
213 group (third class)
214 group (N-th class)
215 shared storage battery (N-th class)
216 shared electric power line (route class)
217 route control portion
218 AC/DC converter
219 DC/AC converter
220 route
221 electric power company (commercial AC power)
300 unit
301 unit control portion
302 unit storage battery
303 electric power monitoring portion
304 charge control portion
305 AC/DC converter
306 DC/AC converter
307 AC plug
308, 309, 310 DC plug
311 lighting fixture
312 personal computer
313 flat television set
314 group control portion
315 shared storage battery
316 shared electric power line
317 electric power company (commercial AC power)
318 electric power monitoring portion
a1, a2, b1~b5 switch
400 group
401 group control portion
401a higher group interface portion
401b charge/discharge control portion
401c lower unit/group electric power monitoring portion
401d lower unit/group controller
402 shared storage battery
403 electric power monitoring portion
404 charge control portion
405 discharge control portion
406 shared electric power line
407 electric power monitoring portion
408 discharge control portion
409 group control portion
410 shared storage battery
411 discharge control portion
412 shared electric power line
c1, c2, d1, d2 switch
500 shared electric power line
501, 502 shared storage battery
503, 504 electric power monitoring portion
505, 506 charge control portion
505a, 506a step-up/down DC/DC converter
505b, 506b constant current driver
507, 508 discharge control portion
507a, 508a step-up/down DC/DC converter
507b, 508b resistor
507c, 508c diode
509~512 switch
600 route
601 route control portion
601a electric power company interface portion
601b charge/discharge control portion
601c lower group electric power monitoring portion
601d lower group controller
602 shared storage battery
603 electric power monitoring portion
604 charge control portion
605 discharge control portion
606 shared electric power line
607 electric power monitoring portion
608 discharge control portion
609 AC/DC converter
610 DC/AC converter
611 electric power monitoring portion
612 electric power company (commercial AC power)
e1, e2, f1, f2 switch

The invention claimed is:

1. An electric power system connected with commercial electric power, comprising;
a first unit equipped with a first power source, a first rechargeable battery to which an output of the first power source and power form the commercial electric power are input, a controller, and a first power consuming portion to which an output of the first rechargeable battery is input;
a second unit equipped with a second power source, a second rechargeable battery to which an output of the second power source and power form the commercial electric power are input, and a second power consuming portion to which an output of the second rechargeable battery is input; and
a first electric power line for sharing electric power directly between the first rechargeable battery and the second rechargeable battery, wherein the electric power is directly transmitted from the first rechargeable battery to the second battery and vice versa through the first electric power line which is controlled by the controller,
wherein the controller is arranged to control electric power transmission directly from the first rechargeable battery to the second rechargeable battery and vice versa through the first electric power line depending on whether or not a present time is in a midnight power rate time slot of the commercial electric power.

2. The electric power system according to claim 1, wherein the first and second power sources are solar panels.

3. The electric power system according to claim 1, wherein the first and second power sources are electric power monitoring portions provided with commercial electric power, respectively.

4. The electric power system according to claim 3, further comprising a first electric power converting portion that converts an input from the commercial electric power into DC power and outputs the DC power to the first rechargeable battery.

5. The electric power system according to claim 1, wherein the first power consuming portion includes a DC power consuming portion.

6. The electric power system according to claim 5, wherein the DC power consuming portion is an LED lighting fixture.

7. The electric power system according to claim 1, wherein the first power consuming portion includes an AC power consuming portion.

8. The electric power system according to claim 7, further comprising a second electric power converting portion that converts an output from the first rechargeable battery into AC power and outputs the AC power to the AC power consuming portion.

9. The electric power system according to claim 1, further comprising a third rechargeable battery that is connected to the first electric power line and can interchange electric power with the first and second rechargeable batteries.

10. The electric power system according to claim 1, wherein the first unit and the second unit are separate homes of individual persons, respectively.

11. The electric power system according to claim 9, wherein the first unit and the second unit forms a first group sharing the third rechargeable battery, and wherein the electric power system further comprises a second group of a plurality of units connected to a second electric power line to share electric power, and a third electric power line to which the first electric power line and the second electric power line are connected to share electric power between the first group and the second group.

12. The electric power system according to claim 11, wherein the plurality of units in the second group are each equipped with a power source, a rechargeable battery and a power consuming portion.

13. The electric power system according to claim 12, wherein the second group includes a common rechargeable battery that is connected to the second electric power line and can interchange electric power with the rechargeable batteries in the plurality of units in the second group.

14. The electric power system according to claim 1, wherein the controller is arranged to sell electric power of the first rechargeable battery having been bought in the midnight power rate time slot to the second rechargeable battery not in the midnight power rate time slot through the first electric power line.

15. An electric power system connected with a commercial electric power, comprising;
a first unit equipped with a first power source, a first rechargeable battery to which an output of the first power source and power form the commercial electric power are input, a controller, and a first power consuming portion to which an output of the first rechargeable battery is input;
a second unit equipped with a second power source, a second rechargeable battery to which an output of the second power source and power form the commercial electric power are input, and a second power consuming portion to which an output of the second rechargeable battery is input; and
a first electric power line for sharing electric power directly between the first rechargeable battery and the second rechargeable battery, wherein the electric power is directly transmitted from the first rechargeable battery to the second battery and vice versa through the first electric power line which is controlled by the controller,
wherein the controller is arranged to control electric power transmission directly from the first rechargeable battery to the second battery and vice versa through the first electric power line depending on whether or not a stored electricity in the first rechargeable battery is equal or larger than electricity that is expected to be consumed by first power consuming portion in the first unit by a next midnight power rate time slot of the commercial electric power.

16. The electric power system according to claim 15, further comprising a third rechargeable battery that is connected to the first electric power line and can interchange electric power with the first and second rechargeable batteries.

17. The electric power system according to claim 16, wherein the first unit and the second unit forms a first group sharing the third rechargeable battery, and wherein the electric power system further comprises a second group of a plurality of units connected to a second electric power line to share electric power, and a third electric power line to which the first electric power line and the second electric power line are connected to share electric power between the first group and the second group.

18. The electric power system according to claim 17, wherein the plurality of units in the second group are each equipped with a power source, a rechargeable battery and a power consuming portion.

19. The electric power system according to claim 18, wherein the second group includes a common rechargeable battery that is connected to the second electric power line and can interchange electric power with the rechargeable batteries in the plurality of units in the second group.

20. The electric power system according to claim 15, wherein the controller is arranged to transmit the electric power from the first rechargeable battery to the second battery through the first electric power line if the stored electricity in the first rechargeable battery is equal or larger than the electricity that can be consumed in the first unit by the next midnight power rate time slot, and not to transmit the electric power from the first rechargeable battery to the second battery through the first electric power line if the stored electricity in the first rechargeable battery is less than the electricity that is expected to be consumed by first power consuming portion in the first unit by the next midnight power rate time slot.

* * * * *